United States Patent
Chung et al.

(10) Patent No.: US 10,019,815 B2
(45) Date of Patent: Jul. 10, 2018

(54) METHODS AND SYSTEMS FOR IMAGE DIFFERENTIATED MULTIPLEX ASSAYS

(71) Applicant: PLEXBIO CO., LTD., Taipei (TW)

(72) Inventors: Yao-Kuang Chung, New Taipei (TW); Chia-En Tai, Taipei (TW); Chien Teng Kao, Taipei (TW)

(73) Assignee: PLEXBIO CO., LTD., Taipei (TW)

( * ) Notice: Subject to any disclaimer, the term of this patent is extended or adjusted under 35 U.S.C. 154(b) by 0 days.

(21) Appl. No.: 15/460,657

(22) Filed: Mar. 16, 2017

(65) Prior Publication Data

US 2017/0270690 A1    Sep. 21, 2017

Related U.S. Application Data

(60) Provisional application No. 62/309,921, filed on Mar. 17, 2016.

(51) Int. Cl.
   *G06K 9/00* (2006.01)
   *G06T 7/00* (2017.01)

(52) U.S. Cl.
   CPC .............. *G06T 7/97* (2017.01); *G06T 7/0012* (2013.01); *G06T 2207/10056* (2013.01)

(58) Field of Classification Search
   CPC ......... G06T 2207/10056; G06T 7/0012; G06T 7/97
   (Continued)

(56) References Cited

U.S. PATENT DOCUMENTS 4,538,913 A    9/1985 Anthon
6,480,802 B1    11/2002 Flormann
(Continued)

FOREIGN PATENT DOCUMENTS

CN    1271410 C    8/2006
CN    102246037 B    5/2014
(Continued)

OTHER PUBLICATIONS

Braeckmans et al., "Encoding Microcarriers: Present and Future Technologies", Nature Reviews Drug Discovery, vol. 1, Jun. 2002, pp. 447-456.
(Continued)

*Primary Examiner* — Manuchehr Rahmjoo
(74) *Attorney, Agent, or Firm* — Morrison & Foerster LLP

(57) ABSTRACT

Provided herein are methods, systems, devices, and computer-readable storage media for measuring flatness (e.g., along a Z-axis) of a detection stage. In some aspects, measuring flatness of the detection stage includes obtaining two or more images representing different Z coordinates of a first XY coordinate on a substantially flat substrate positioned on the detection stage; determining a sharpest Z coordinate at the first XY coordinate based on sharpness of the two or more images; obtaining two or more images representing different Z coordinates of a second XY coordinate spaced apart from the first XY coordinate on the substantially flat substrate; determining a sharpest Z coordinate at the second XY coordinate based on sharpness of the two or more images; and calculating a difference between the sharpest Z coordinates at the first and the second XY coordinates to measure the flatness of the detection stage.

48 Claims, 15 Drawing Sheets

(58) Field of Classification Search
USPC .................................................... 382/128
See application file for complete search history.

(56) References Cited

U.S. PATENT DOCUMENTS

| | | | |
|---|---|---|---|
| 7,858,307 | B2 | 12/2010 | Ho |
| 7,871,770 | B2 | 1/2011 | Ho |
| 8,148,139 | B2 | 4/2012 | Ho |
| 8,232,092 | B2 | 7/2012 | Ho et al. |
| 8,610,848 | B2 | 12/2013 | Shim et al. |
| 8,939,376 | B1 | 1/2015 | De Smedt et al. |
| 8,967,483 | B2 | 3/2015 | De Smedt et al. |
| 9,040,463 | B2 | 5/2015 | Demierre et al. |
| 9,063,044 | B2 | 6/2015 | Kao et al. |
| 9,255,922 | B2 | 2/2016 | Ho et al. |
| 2006/0097056 | A1 | 5/2006 | De Smedt et al. |
| 2009/0051931 | A1* | 2/2009 | Zwemer ............... G01B 11/254 356/605 |
| 2009/0201504 | A1 | 8/2009 | Ho et al. |
| 2010/0075438 | A1 | 3/2010 | Ho et al. |
| 2010/0081215 | A1 | 4/2010 | De Geest et al. |
| 2010/0210477 | A1 | 8/2010 | Ho |
| 2011/0007955 | A1 | 1/2011 | Ho et al. |
| 2012/0088691 | A1 | 4/2012 | Chen et al. |
| 2012/0153188 | A1* | 6/2012 | Barrett ................... G01N 33/84 250/461.1 |
| 2013/0302910 | A1 | 11/2013 | Demierre |
| 2013/0315466 | A1* | 11/2013 | Drell .................. G06K 9/00127 382/133 |
| 2014/0274778 | A1 | 9/2014 | Tsao et al. |
| 2015/0057190 | A1 | 2/2015 | De Smedt et al. |
| 2017/0160272 | A1 | 6/2017 | Tsao et al. |

FOREIGN PATENT DOCUMENTS

| | | |
|---|---|---|
| EP | 1173760 B1 | 6/2005 |
| EP | 2100143 A1 | 9/2009 |
| EP | 2179289 A1 | 4/2010 |
| EP | 2342561 A1 | 7/2011 |
| EP | 2367633 A1 | 9/2011 |
| EP | 2484447 A1 | 8/2012 |
| EP | 2673086 A1 | 12/2013 |
| EP | 1903337 B1 | 7/2015 |
| WO | 2000/63695 A1 | 10/2000 |
| WO | 2008/034275 A1 | 3/2008 |
| WO | 2009/020506 A1 | 2/2009 |
| WO | 2009/128938 A1 | 10/2009 |
| WO | 2010/042745 A1 | 4/2010 |
| WO | 2010/072011 A1 | 7/2010 |
| WO | 2011/014879 A2 | 2/2011 |
| WO | 2012/106827 A1 | 8/2012 |
| WO | 2014/031997 A1 | 2/2014 |
| WO | 2014/144016 A1 | 9/2014 |
| WO | 2016/198954 A1 | 12/2016 |

OTHER PUBLICATIONS

Derveaux et al., "Layer-by-Layer Coated Digitally Encoded Microcarriers for Quantification of Proteins in Serum and Plasma", Analytical Chemistry, Dec. 4, 2007, pp. 85-94.
International Search Report and Written Opinion received for PCT Patent Application No. PCT/IB2016/000937, dated Oct. 27, 2016, 7 pages.
Chung et al., U.S. Appl. No. 15/358,024, filed Nov. 21, 2016, titled "Methods and Systems for Selection of Detection Area".
Yao et al., "Evaluation of Sharpness Measures and Search Algorithms for the Auto-Focusing of High Magnification Images", SPIE 6246, Visual Information Processing XV, 2006, 12 pages.
Yousefi et al., "A New Auto-Focus Sharpness Function for Digital and Smart-Phone Cameras", IEEE Transactions on Consumer Electronics, vol. 57, No. 3, Aug. 2011, pp. 1003-1009.

* cited by examiner

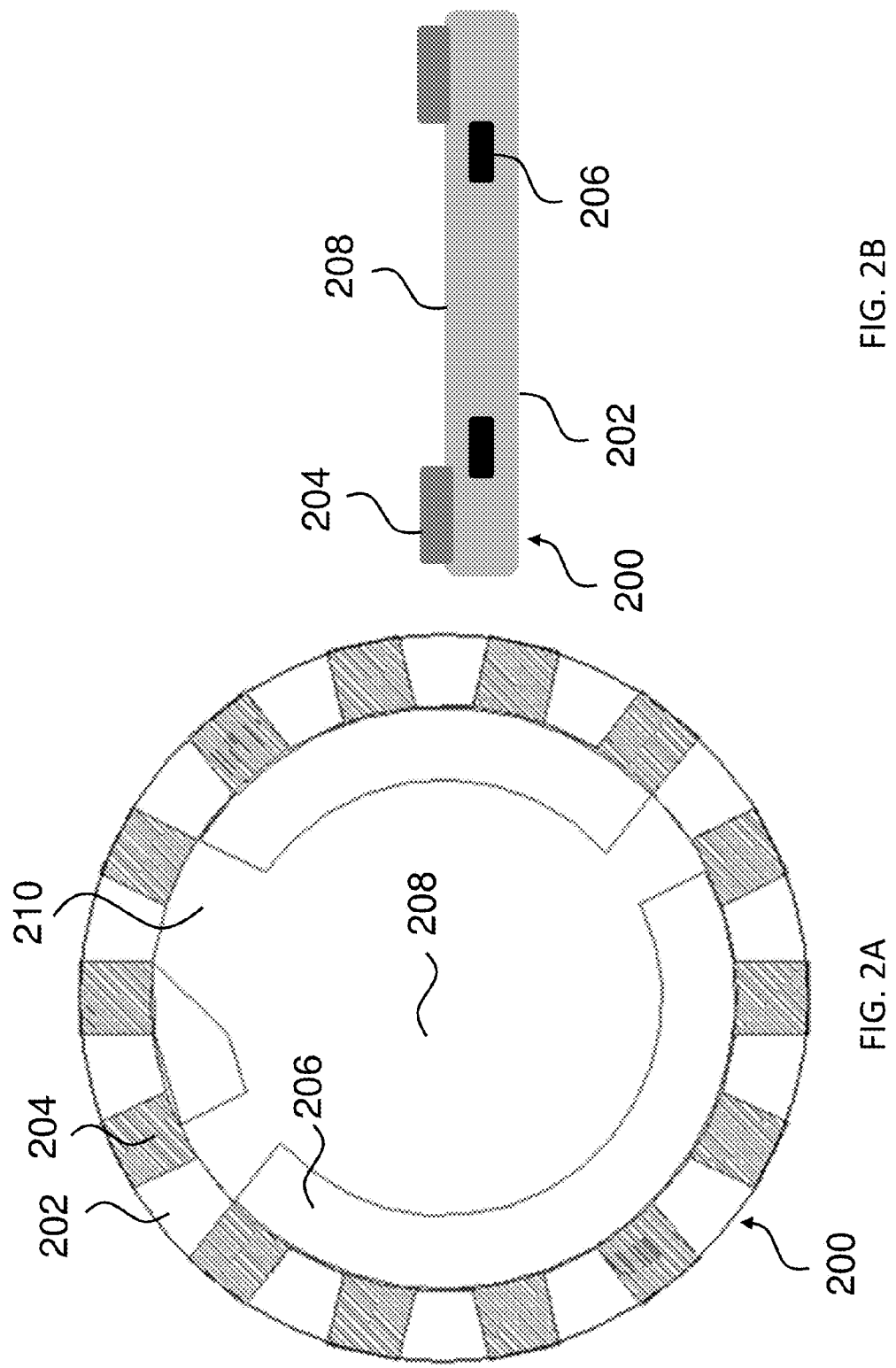

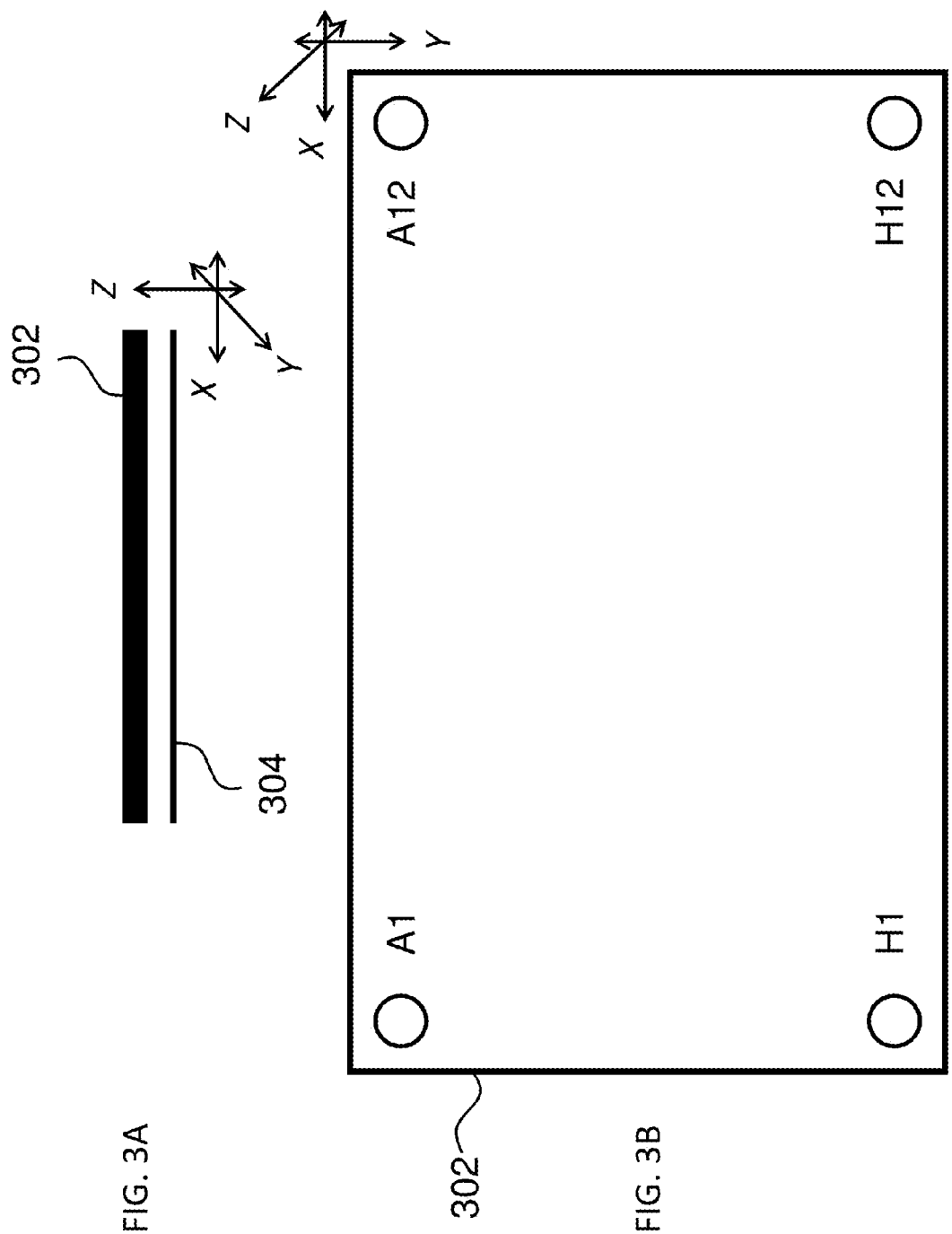

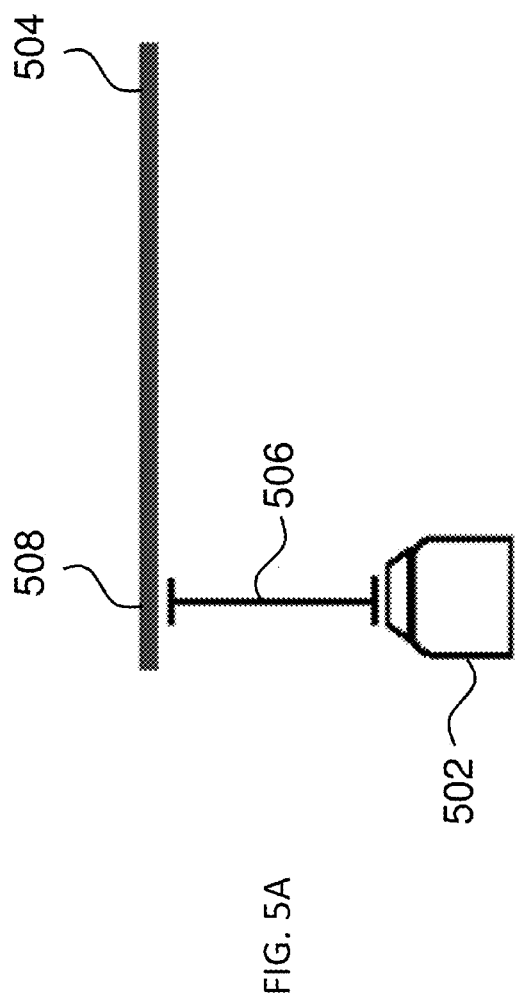
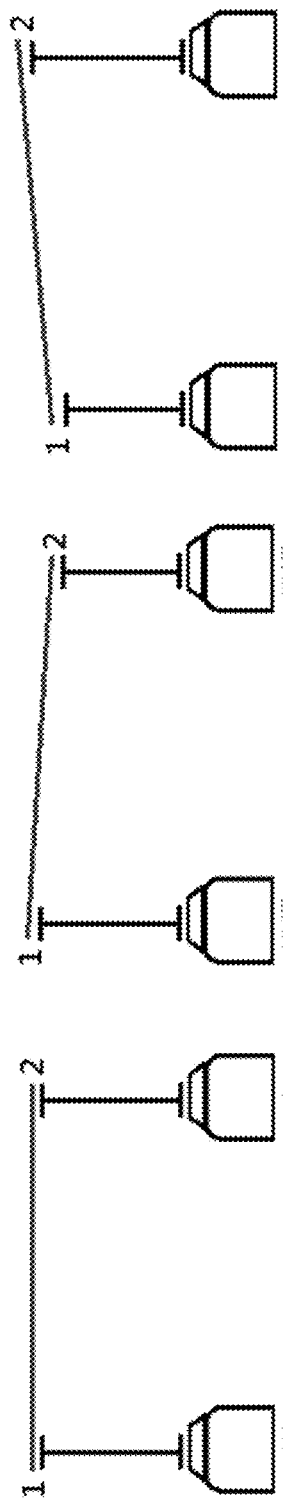
FIG. 5A
FIG. 5B

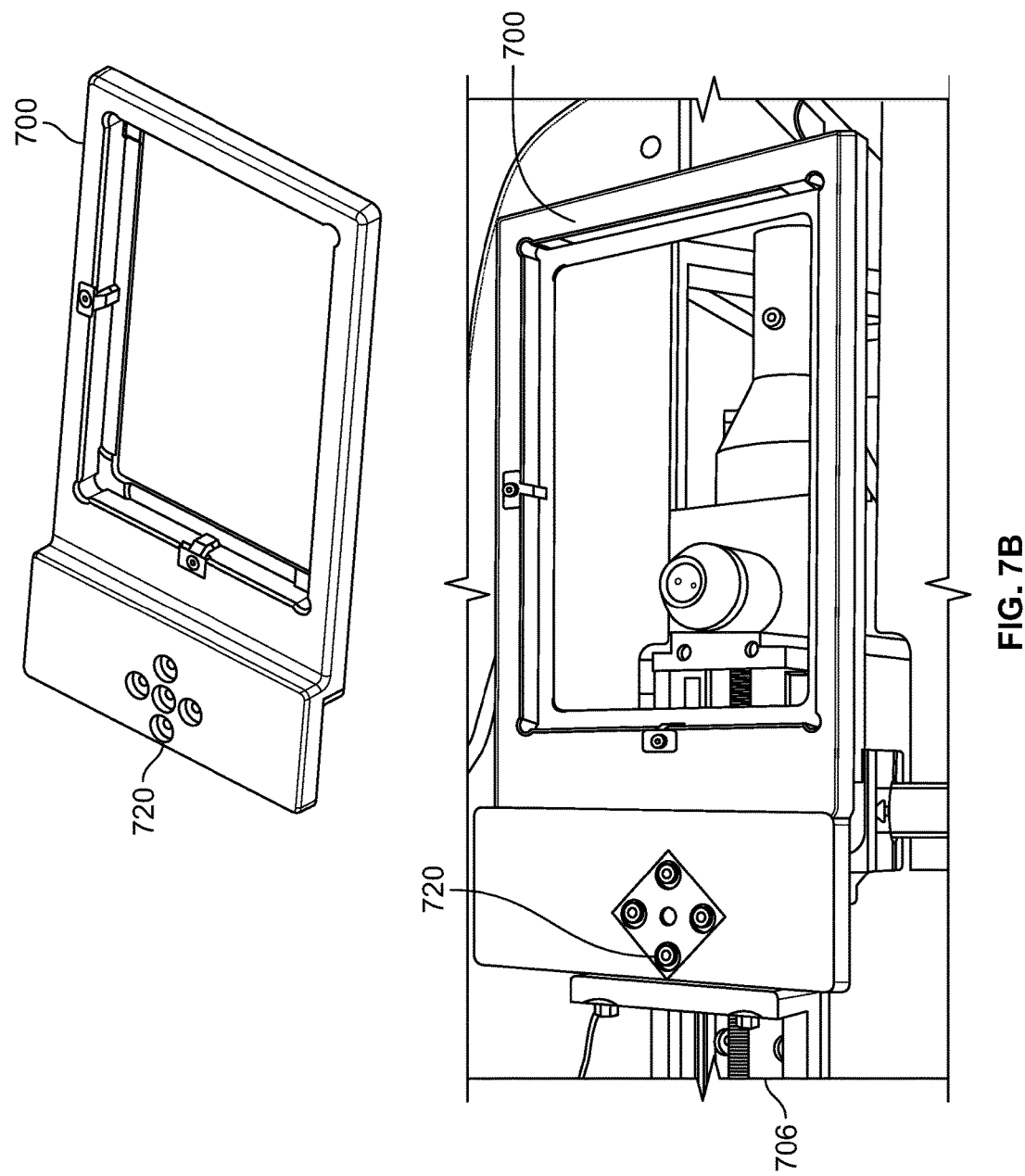

METHODS AND SYSTEMS FOR IMAGE DIFFERENTIATED MULTIPLEX ASSAYS

CROSS REFERENCE TO RELATED APPLICATIONS

This application claims the priority benefit of U.S. Provisional Application Ser. No. 62/309,921, filed Mar. 17, 2016, which is incorporated herein by reference in its entirety.

FIELD

Provided herein are methods and systems for measuring flatness of a detection stage. The detection stage may be used, e.g., to position an assay plate during a multiplex assay. Measuring flatness may include determining sharpness of two or more Z coordinates at each of a first and a second XY coordinate spaced apart on a substantially flat substrate positioned on the detection stage, and calculating a difference between the sharpest Z coordinates at the first and the second XY coordinates.

BACKGROUND

Immunological and molecular diagnostic assays play a critical role both in the research and clinical fields. Often it is necessary to perform assays for a panel of multiple targets to gain a meaningful or bird's-eye view of results to facilitate research or clinical decision-making. This is particularly true in the era of genomics and proteomics, where an abundance of genetic markers and/or biomarkers are thought to influence or be predictive of particular disease states. In theory, assays of multiple targets can be accomplished by testing each target separately in parallel or sequentially in different reaction vessels (i.e., multiple singleplexing). However, not only are assays adopting a singleplexing strategy often cumbersome, but they also typically required large sample volumes, especially when the targets to be analyzed are large in number.

A multiplex assay simultaneously measures multiple analytes (two or more) in a single assay. Multiplex assays are commonly used in high-throughput screening settings, where many specimens can be analyzed at once. It is the ability to assay many analytes simultaneously and many specimens in parallel that is the hallmark of multiplex assays and is the reason that such assays have become a powerful tool in fields ranging from drug discovery to functional genomics to clinical diagnostics. In contrast to singleplexing, by combining all targets in the same reaction vessel, the assay is much less cumbersome and much easier to perform, since only one reaction vessel is handled per sample. The required test samples can thus be dramatically reduced in volume, which is especially important when samples (e.g., tumor tissues, cerebral spinal fluid, or bone marrow) are difficult and/or invasive to retrieve in large quantities. Equally important is the fact that the reagent cost can be decreased and assay throughput increased drastically.

Many assays of complex macromolecule samples are composed of two steps. In the first step, agents capable of specifically capturing the target macromolecules are attached to a solid phase surface. These immobilized molecules may be used to capture the target macromolecules from a complex sample by various means, such as hybridization (e.g., in DNA, RNA based assays) or antigen-antibody interactions (in immunoassays). In the second step, detection molecules are incubated with and bind to the complex of capture molecule and the target, emitting signals such as fluorescence or other electromagnetic signals. The amount of the target is then quantified by the intensity of those signals.

Multiplex assays may be carried out by utilizing multiple capture agents, each specific for a different target macromolecule. In chip-based array multiplex assays, each type of capture agent is attached to a pre-defined position on the chip. The amount of multiplex targets in a complex sample is determined by measuring the signal of the detection molecule at each position corresponding to a type of capture agent. In suspension array multiplex assays, microparticles or microcarriers are suspended in the assay solution. These microparticles or microcarriers contain an identification element, which may be embedded, printed, or otherwise generated by one or more elements of the microparticle/microcarrier. Each type of capture agent is immobilized to particles with the same ID, and the signals emitted from the detection molecules on the surface of the particles with a particular ID reflect the amount of the corresponding target.

Accurate measurements are highly desirable for analyte detection, e.g., multiplex assays. Microcarrier-based analyte detection assays are often performed using flat microwell assay plates. Such plates allow for high-throughput analysis of multiple samples and/or analytes. However, reading these plates can also introduce systematic errors and/or inefficiencies into the detection process. For example, if the assay plate is not read on a substantially flat detection stage, optical measurements may be inaccurate or variable due to differences in the position of different wells of the plate along the Z-axis. Even if the system is able to account for such differences by changing focus, changing the focus for individual wells wastes time, thereby reducing the efficiency and speed of the assays. Existing methods for measuring flatness of a material are not adapted for calibrating flatness of a detection stage for use in analyte detection on an assay plate (see, e.g., U.S. Pat. Nos. 6,480,802 and 4,538,913; and U.S. PG Pub. No. 2009/0051931).

Therefore, a need exists for methods, systems, devices, and computer-readable storage media that reduce these sources of systematic error and/or inefficiency. Such methods, systems, devices, and computer-readable storage media allow the user to calibrate the assay reading device such that the assay plate is read on a flat detection stage, saving time and resources.

All publications, patents, and patent applications cited herein are hereby incorporated by reference in their entirety for all purposes.

BRIEF SUMMARY

To meet this need, provided herein, inter alia, are methods and systems for measuring flatness along a Z-axis of a detection stage, e.g., as part of an electronic device. These methods and systems may be used, e.g., to improve the accuracy, speed, and/or efficiency of multiplex assays. Devices and computer-readable storage media related thereto are further provided.

Accordingly, in one aspect, provided herein are methods for measuring flatness along a Z-axis of a detection stage. In some embodiments, the methods include (a) obtaining two or more images of a first XY coordinate on a substantially flat substrate positioned on the detection stage, wherein the two or more images represent different Z coordinates at the first XY coordinate; (b) determining a sharpest Z coordinate at the first XY coordinate based on sharpness of the two or more images representing different Z coordinates at the first XY coordinate; (c) obtaining two or more images of a second XY coordinate spaced apart from the first XY coordinate on the substantially flat substrate, wherein the two or more images of the second XY coordinate represent different Z coordinates at the second XY coordinate; (d) determining a sharpest Z coordinate at the second XY coordinate based on sharpness of the two or more images representing different Z coordinates at the second XY coordinate; and (e) calculating a difference between the sharpest Z coordinate at the first XY coordinate and the sharpest Z coordinate at the second XY coordinate to measure the flatness of the detection stage along the Z-axis. In other embodiments, the methods include: at an electronic device comprising one or more processors: (a) obtaining first data representing two or more images of a first XY coordinate on a substantially flat substrate positioned on the detection stage, wherein the two or more images represent different Z coordinates at the first XY coordinate; (b) based on the first data, determining a sharpest Z coordinate at the first XY coordinate based on sharpness of the two or more images representing different Z coordinates at the first XY coordinate; (c) obtaining second data representing two or more images of a second XY coordinate spaced apart from the first XY coordinate on the substantially flat substrate, wherein the two or more images of the second XY coordinate represent different Z coordinates at the second XY coordinate; (d) based on the second data, determining a sharpest Z coordinate at the second XY coordinate based on sharpness of the two or more images representing different Z coordinates at the second XY coordinate; and (e) calculating a difference between the sharpest Z coordinate at the first XY coordinate and the sharpest Z coordinate at the second XY coordinate to measure the flatness of the detection stage along the Z-axis. In still other embodiments, the methods include: at an electronic device comprising an objective, a light source, a camera, and a detection stage: (a) positioning a substantially flat substrate on the detection stage perpendicular to the objective, the camera, and the light source; (b) obtaining two or more images of a first XY coordinate on a substantially flat substrate positioned on the detection stage, wherein the two or more images represent different Z coordinates at the first XY coordinate; (c) determining a sharpest Z coordinate at the first XY coordinate based on sharpness of the two or more images representing different Z coordinates at the first XY coordinate; (d) obtaining two or more images of a second XY coordinate spaced apart from the first XY coordinate on the substantially flat substrate, wherein the two or more images of the second XY coordinate represent different Z coordinates at the second XY coordinate; (e) determining a sharpest Z coordinate at the second XY coordinate based on sharpness of the two or more images representing different Z coordinates at the second XY coordinate; and (f) calculating a difference between the sharpest Z coordinate at the first XY coordinate and the sharpest Z coordinate at the second XY coordinate to measure the flatness of the detection stage along the Z-axis.

In some embodiments, the detection stage is a movable detection stage, and the methods further comprise: obtaining the two or more images of the second XY coordinate, moving the detection stage to re-position the substantially flat substrate such that the second XY coordinate is aligned with the objective, the light source, and the camera. In some embodiments, the detection stage is coupled to a motor configured to move the detection stage along an X-axis. In some embodiments, the detection stage is coupled to a motor configured to move the detection stage along a Y-axis. In some embodiments, the objective is a movable objective, obtaining the two or more images representing different Z coordinates at the first XY coordinate comprises re-positioning the objective along the Z-axis, and obtaining the two or more images representing different Z coordinates at the second XY coordinate comprises re-positioning the objective along the Z-axis. In some embodiments, the objective is coupled to a motor configured to move the objective along the Z-axis. In some embodiments, the methods further include adjusting the detection stage along the Z-axis to reduce the calculated difference between the sharpest Z coordinate at the first XY coordinate and the sharpest Z coordinate at the second XY coordinate. In some embodiments, the sharpest Z coordinate at the first XY coordinate and the sharpest Z coordinate at the second XY coordinate are both determined using one or more sharpness functions selected from the group consisting of Vollath's F4, Vollath's F5, sharpness variance, sharpness gradient, sharpness entropy, Bayes spectral entropy (BSE), mid frequency discrete cosine transform (DCT), robust discrete cosine transform (DCT), sum of differences across rows (SMD1), sum of differences across rows and columns (SMD2), sum of modified Laplacians (SML), squared gradient, and modulation transfer function (MTF). In some embodiments, the substantially flat substrate has a first end and a second end along the Z-axis, and wherein the positions of the first end and the second end differ along the Z-axis by less than about 200 µm. In some embodiments, the substantially flat substrate comprises a glass plate comprising a visible pattern on at least the first and the second XY coordinates. In some embodiments, the substantially flat substrate comprises a multiwell plate. In some embodiments, the first XY coordinate is located at a first well of the multiwell plate, the second XY coordinate is located at a second well of the multiwell plate, and the first and the second wells of the multiwell plate each comprise one or more objects for imaging. In some embodiments, the one or more objects for imaging comprise one or more encoded microcarriers. In some embodiments, the substantially flat substrate is substantially rectangular. In some embodiments, the first XY coordinate is positioned at a first corner of the substantially flat substrate, and the second XY coordinate is positioned at a second corner of the substantially flat substrate. In some embodiments, the methods further include repeating steps (a)-(e) for a third XY coordinate and a fourth XY coordinate, wherein the third and the fourth XY coordinates are different from the first and the second XY coordinates, and wherein the third XY coordinate and the fourth XY coordinate replace the first and the second XY coordinates, respectively, during the repeated steps (a)-(e). In some embodiments, the methods further include repeating steps (a)-(f) for a third XY coordinate and a fourth XY coordinate, wherein the third and the fourth XY coordinates are different from the first and the second XY coordinates, and wherein the third XY coordinate and the fourth XY coordinate replace the first and the second XY coordinates, respectively, during the repeated steps (a)-(f). In some embodiments, the substantially flat substrate is substantially rectangular, the first XY coordinate is positioned at a first corner of the substantially flat substrate, the second XY coordinate is positioned at a second corner of the substantially flat substrate, the third XY coordinate is positioned at a third corner of the substantially flat substrate, and the fourth XY coordinate is positioned at a fourth corner of the substantially flat substrate. In some embodiments, the detection stage is configured to receive a multiwell plate. In some embodiments, the methods further include, after step (f): (g) positioning an assay plate on the detection stage perpendicular to the objective, the camera, and the light source, wherein the assay plate comprises: a plurality of encoded microcarriers, and a solution comprising at least a first analyte, wherein at least a first encoded microcarrier of the plurality comprises a capture agent specific for the first analyte; (h) obtaining a first image of the assay plate, wherein first image comprises an image of the code of the first encoded microcarrier; and (i) obtaining a second image of the assay plate, wherein the second image detects an amount of the first analyte bound to the first encoded microcarrier by the capture agent. In some embodiments, the solution further comprises a second analyte, the plurality of encoded microcarriers further comprises a second encoded microcarrier comprising a second capture agent specific for the second analyte, and wherein the methods further include, after step (i): (j) obtaining a third image of the assay plate, wherein third image comprises an image of the code of the second encoded microcarrier; and (k) obtaining a fourth image of the assay plate, wherein the fourth image detects an amount of the second analyte bound to the second encoded microcarrier by the second capture agent. In some embodiments, the first and the second analytes are different. In some embodiments, the first encoded microcarrier is in a first well of the assay plate, the second encoded microcarrier is in a second well of the assay plate, the first and the second wells are different, and the first and the second wells each comprise a portion of the solution. In some embodiments, the code of the first encoded microcarrier comprises a first analog code. In some embodiments, the code of the first encoded microcarrier comprises a first analog code, the code of the second encoded microcarrier comprises a second analog code, and the first and the second analog codes are different.

In another aspect, provided herein are systems comprising: an objective, a camera, a light source, a detection stage, one or more processors, a memory, and one or more programs stored in the memory, wherein the one or more programs are configured to be executed by the one or more processors, and wherein the one or more programs include instructions for: (a) obtaining first data representing two or more images of a first XY coordinate on a substantially flat substrate positioned on the detection stage, wherein the two or more images represent different Z coordinates at the first XY coordinate; (b) based on the first data, determining a sharpest Z coordinate at the first XY coordinate based on sharpness of the two or more images representing different Z coordinates at the first XY coordinate; (c) obtaining second data representing two or more images of a second XY coordinate spaced apart from the first XY coordinate on the substantially flat substrate, wherein the two or more images of the second XY coordinate represent different Z coordinates at the second XY coordinate; (d) based on the second data, determining a sharpest Z coordinate at the second XY coordinate based on sharpness of the two or more images representing different Z coordinates at the second XY coordinate; and (e) calculating a difference between the sharpest Z coordinate at the first XY coordinate and the sharpest Z coordinate at the second XY coordinate to measure the flatness of the detection stage along the Z-axis.

In some embodiments, the detection stage is a movable detection stage, and the one or more programs further include instructions for: before obtaining the second data, moving the detection stage to re-position the substantially flat substrate such that the second XY coordinate is aligned with the objective, the light source, and the camera. In some embodiments, the detection stage is coupled to a motor configured to move the detection stage along an X-axis. In some embodiments, the detection stage is coupled to a motor configured to move the detection stage along a Y-axis. In some embodiments, the objective is a movable objective, obtaining the first data comprises re-positioning the objective along the Z-axis at the first XY coordinate, and obtaining the second data comprises re-positioning the objective along the Z-axis at the second XY coordinate. In some embodiments, the objective is coupled to a motor configured to move the objective along the Z-axis. In some embodiments, the one or more programs further include instructions for: adjusting the detection stage along the Z-axis to reduce the calculated difference between the sharpest Z coordinate at the first XY coordinate and the sharpest Z coordinate at the second XY coordinate. In some embodiments, the sharpest Z coordinate at the first XY coordinate and the sharpest Z coordinate at the second XY coordinate are both determined using one or more sharpness functions selected from the group consisting of Vollath's F4, Vollath's F5, sharpness variance, sharpness gradient, sharpness entropy, Bayes spectral entropy (BSE), mid frequency discrete cosine transform (DCT), robust discrete cosine transform (DCT), sum of differences across rows (SMD1), sum of differences across rows and columns (SMD2), sum of modified Laplacians (SML), squared gradient, and modulation transfer function (MTF). In some embodiments, the substantially flat substrate has a first end and a second end along the Z-axis, and the positions of the first end and the second end differ along the Z-axis by less than about 200 µm. In some embodiments, the substantially flat substrate comprises a glass plate comprising a visible pattern on at least the first and the second XY coordinates. In some embodiments, the substantially flat substrate comprises a multiwell plate. In some embodiments, the first XY coordinate is located at a first well of the multiwell plate, the second XY coordinate is located at a second well of the multiwell plate, and the first and the second wells of the multiwell plate each comprise one or more objects for imaging. In some embodiments, the one or more objects for imaging comprise one or more encoded microcarriers. In some embodiments, the substantially flat substrate is substantially rectangular. In some embodiments, the first XY coordinate is positioned at a first corner of the substantially flat substrate, and the second XY coordinate is positioned at a second corner of the substantially flat substrate. In some embodiments, the one or more programs further include instructions for: repeating steps (a)-(e) for a third XY coordinate and a fourth XY coordinate, wherein the third and the fourth XY coordinates are different from the first and the second XY coordinates, and wherein the third XY coordinate and the fourth XY coordinate replace the first and the second XY coordinates, respectively, during the repeated steps (a)-(e). In some embodiments, the substantially flat substrate is substantially rectangular, the first XY coordinate is positioned at a first corner of the substantially flat substrate, the second XY coordinate is positioned at a second corner of the substantially flat substrate, the third XY coordinate is positioned at a third corner of the substantially flat substrate, and the fourth XY coordinate is positioned at a fourth corner of the substantially flat substrate. In some embodiments, the detection stage is configured to receive a multiwell plate. In some embodiments, the one or more programs further include instructions for, after step (e): (f) obtaining third data representing a first image of an assay plate, wherein the assay plate is positioned on the detection stage, wherein the assay plate comprises a plurality of encoded microcarriers and a solution comprising at least a first analyte, wherein at least a first encoded microcarrier of the plurality comprises a capture agent specific for the first analyte, and wherein first image comprises an image of the code of the first encoded microcarrier; and (g) obtaining fourth data representing a second image of the assay plate, wherein the second image detects an amount of the first analyte bound to the first encoded microcarrier by the capture agent. In some embodiments, the solution further comprises a second analyte, wherein the plurality of encoded microcarriers further comprises a second encoded microcarrier comprising a second capture agent specific for the second analyte, and wherein the one or more programs further include instructions for, after step (g): (h) obtaining fifth data representing a third image of the assay plate, wherein third image comprises an image of the code of the second encoded microcarrier; and (i) obtaining sixth data representing a fourth image of the assay plate, wherein the fourth image detects an amount of the second analyte bound to the second encoded microcarrier by the second capture agent. In some embodiments, the first and the second analytes are different. In some embodiments, the first encoded microcarrier is in a first well of the assay plate, the second encoded microcarrier is in a second well of the assay plate, the first and the second wells are different, and the first and the second wells each comprise a portion of the solution. In some embodiments, the code of the first encoded microcarrier comprises a first analog code. In some embodiments, the code of the first encoded microcarrier comprises a first analog code, the code of the second encoded microcarrier comprises a second analog code, and the first and the second analog codes are different.

In another aspect, provided herein are non-transitory computer-readable storage media comprising one or more programs for execution by one or more processors of an electronic device with an objective, a camera, a light source, and a detection stage, the one or more programs including instructions which, when executed by the one or more processors, cause the device to: obtain first data representing two or more images of a first XY coordinate on a substantially flat substrate positioned on the detection stage, wherein the two or more images represent different Z coordinates at the first XY coordinate; based on the first data, determine a sharpest Z coordinate at the first XY coordinate based on sharpness of the two or more images representing different Z coordinates at the first XY coordinate; obtain second data representing two or more images of a second XY coordinate spaced apart from the first XY coordinate on the substantially flat substrate, wherein the two or more images of the second XY coordinate represent different Z coordinates at the second XY coordinate; based on the second data, determine a sharpest Z coordinate at the second XY coordinate based on sharpness of the two or more images representing different Z coordinates at the second XY coordinate; and calculate a difference between the sharpest Z coordinate at the first XY coordinate and the sharpest Z coordinate at the second XY coordinate to measure the flatness of the detection stage along the Z-axis. In another aspect, provided herein are non-transitory computer-readable storage media comprising one or more programs for execution by one or more processors of an electronic device with an objective, a camera, a light source, and a detection stage, the one or more programs including instructions which, when executed by the one or more processors, cause the device to perform the method according to any of the above embodiments.

In another aspect, provided herein are electronic imaging devices comprising: an objective, a camera, a light source, a detection stage, and a processing unit, the processing unit coupled to the objective, the camera, the light source, and the detection stage, the processing unit configured to: using the objective, the light source, and the camera, obtain first data representing two or more images of a first XY coordinate on a substantially flat substrate positioned on the detection stage, wherein the two or more images represent different Z coordinates at the first XY coordinate; based on the first data, determine a sharpest Z coordinate at the first XY coordinate based on sharpness of the two or more images representing different Z coordinates at the first XY coordinate; using the objective, the light source, and the camera, obtain second data representing two or more images of a second XY coordinate spaced apart from the first XY coordinate on the substantially flat substrate, wherein the two or more images of the second XY coordinate represent different Z coordinates at the second XY coordinate; based on the second data, determine a sharpest Z coordinate at the second XY coordinate based on sharpness of the two or more images representing different Z coordinates at the second XY coordinate; and calculate a difference between the sharpest Z coordinate at the first XY coordinate and the sharpest Z coordinate at the second XY coordinate to measure the flatness of the detection stage along the Z-axis. In another aspect, provided herein are electronic imaging devices comprising: an objective, a camera, a light source, a detection stage, and a processing unit, the processing unit coupled to the objective, the camera, the light source, and the detection stage, the processing unit configured to perform the method according to any of the above embodiments.

It is to be understood that one, some, or all of the properties of the various embodiments described herein may be combined to form other embodiments of the present invention. These and other aspects of the invention will become apparent to one of skill in the art.

BRIEF DESCRIPTION OF THE DRAWINGS

FIGS. 2A & 2B show two views of an exemplary microcarrier.

FIGS. 3A & 3B show schematic diagrams of a substrate and detection stage in accordance with some embodiments.

FIGS. 5A & 5B illustrate measurement of Z coordinates at multiple XY coordinates in accordance with some embodiments.

FIGS. 7A & 7B show an exemplary system with a detection stage and imaging device in accordance with some embodiments.

DETAILED DESCRIPTION

Figure 1:
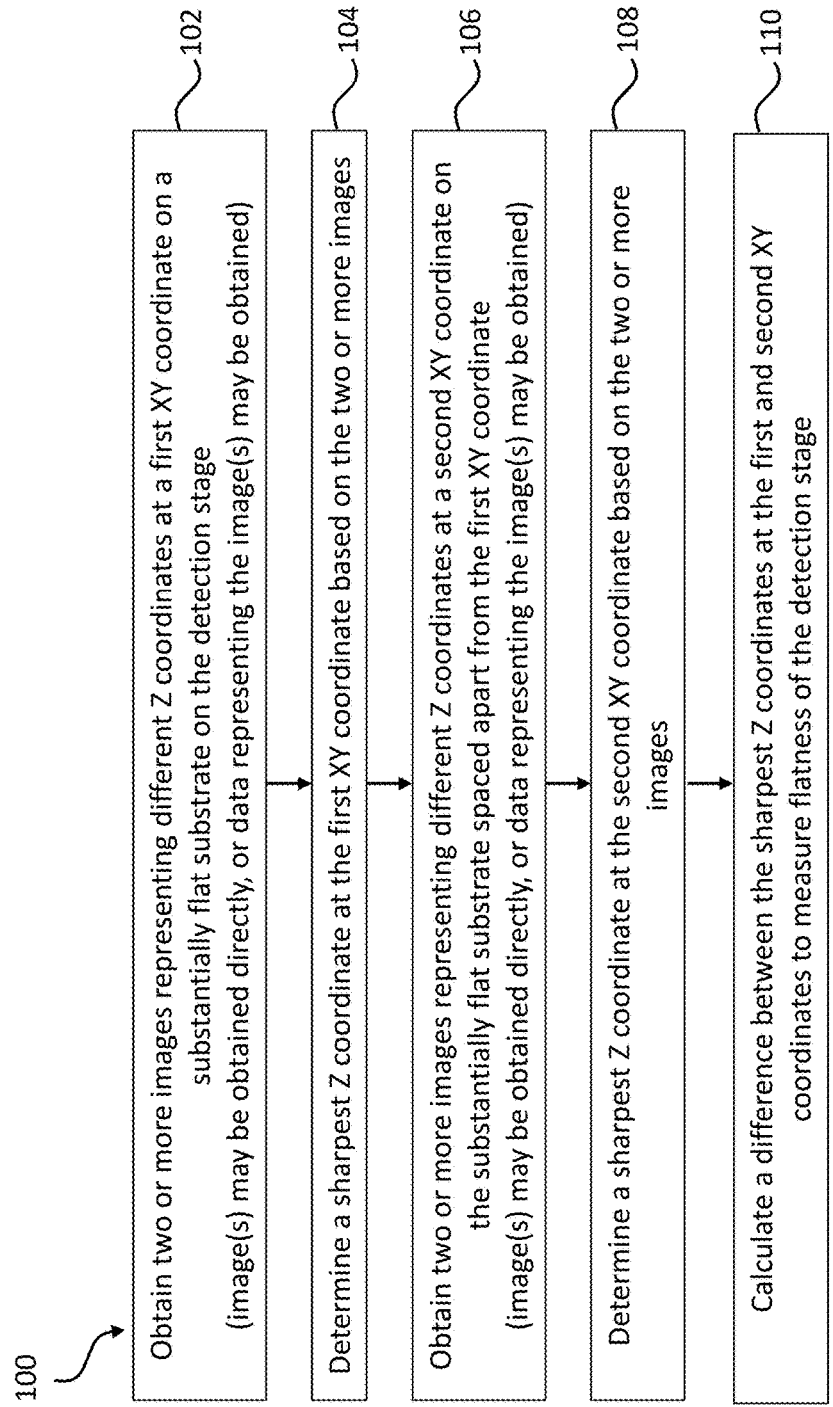
FIG. 1 is a flow diagram illustrating a method for measuring flatness of a detection stage in accordance with some embodiments.

In one aspect, provided herein are methods for measuring flatness along a Z-axis of a detection stage. In some embodiments, the methods include (a) obtaining two or more images of a first XY coordinate on a substantially flat substrate positioned on the detection stage, wherein the two or more images represent different Z coordinates at the first XY coordinate; (b) determining a sharpest Z coordinate at the first XY coordinate based on sharpness of the two or more images representing different Z coordinates at the first XY coordinate; (c) obtaining two or more images of a second XY coordinate spaced apart from the first XY coordinate on the substantially flat substrate, wherein the two or more images of the second XY coordinate represent different Z coordinates at the second XY coordinate; (d) determining a sharpest Z coordinate at the second XY coordinate based on sharpness of the two or more images representing different Z coordinates at the second XY coordinate; and (e) calculating a difference between the sharpest Z coordinate at the first XY coordinate and the sharpest Z coordinate at the second XY coordinate to measure the flatness of the detection stage along the Z-axis. In other embodiments, the methods include: at an electronic device comprising one or more processors: (a) obtaining first data representing two or more images of a first XY coordinate on a substantially flat substrate positioned on the detection stage, wherein the two or more images represent different Z coordinates at the first XY coordinate; (b) based on the first data, determining a sharpest Z coordinate at the first XY coordinate based on sharpness of the two or more images representing different Z coordinates at the first XY coordinate; (c) obtaining second data representing two or more images of a second XY coordinate spaced apart from the first XY coordinate on the substantially flat substrate, wherein the two or more images of the second XY coordinate represent different Z coordinates at the second XY coordinate; (d) based on the second data, determining a sharpest Z coordinate at the second XY coordinate based on sharpness of the two or more images representing different Z coordinates at the second XY coordinate; and (e) calculating a difference between the sharpest Z coordinate at the first XY coordinate and the sharpest Z coordinate at the second XY coordinate to measure the flatness of the detection stage along the Z-axis. In still other embodiments, the methods include: at an electronic device comprising an objective, a light source, a camera, and the detection stage: (a) positioning a substantially flat substrate on the detection stage perpendicular to the objective, the camera, and the light source; (b) obtaining two or more images of a first XY coordinate on a substantially flat substrate positioned on the detection stage, wherein the two or more images represent different Z coordinates at the first XY coordinate; (c) determining a sharpest Z coordinate at the first XY coordinate based on sharpness of the two or more images representing different Z coordinates at the first XY coordinate; (d) obtaining two or more images of a second XY coordinate spaced apart from the first XY coordinate on the substantially flat substrate, wherein the two or more images of the second XY coordinate represent different Z coordinates at the second XY coordinate; (e) determining a sharpest Z coordinate at the second XY coordinate based on sharpness of the two or more images representing different Z coordinates at the second XY coordinate; and (f) calculating a difference between the sharpest Z coordinate at the first XY coordinate and the sharpest Z coordinate at the second XY coordinate to measure the flatness of the detection stage along the Z-axis.

In another aspect, provided herein are systems comprising: an objective, a camera, a light source, a detection stage, one or more processors, a memory, and one or more programs stored in the memory, wherein the one or more programs are configured to be executed by the one or more processors, and wherein the one or more programs include instructions for: (a) obtaining first data representing two or more images of a first XY coordinate on a substantially flat substrate positioned on the detection stage, wherein the two or more images represent different Z coordinates at the first XY coordinate; (b) based on the first data, determining a sharpest Z coordinate at the first XY coordinate based on sharpness of the two or more images representing different Z coordinates at the first XY coordinate; (c) obtaining second data representing two or more images of a second XY coordinate spaced apart from the first XY coordinate on the substantially flat substrate, wherein the two or more images of the second XY coordinate represent different Z coordinates at the second XY coordinate; (d) based on the second data, determining a sharpest Z coordinate at the second XY coordinate based on sharpness of the two or more images representing different Z coordinates at the second XY coordinate; and (e) calculating a difference between the sharpest Z coordinate at the first XY coordinate and the sharpest Z coordinate at the second XY coordinate to measure the flatness of the detection stage along the Z-axis.

In another aspect, provided herein are non-transitory computer-readable storage media comprising one or more programs for execution by one or more processors of an electronic device with an objective, a camera, a light source, and a detection stage, the one or more programs including instructions which, when executed by the one or more processors, cause the device to: obtain first data representing two or more images of a first XY coordinate on a substantially flat substrate positioned on the detection stage, wherein the two or more images represent different Z coordinates at the first XY coordinate; based on the first data, determine a sharpest Z coordinate at the first XY coordinate based on sharpness of the two or more images representing different Z coordinates at the first XY coordinate; obtain second data representing two or more images of a second XY coordinate spaced apart from the first XY coordinate on the substantially flat substrate, wherein the two or more images of the second XY coordinate represent different Z coordinates at the second XY coordinate; based on the second data, determine a sharpest Z coordinate at the second XY coordinate based on sharpness of the two or more images representing different Z coordinates at the second XY coordinate; and calculate a difference between the sharpest Z coordinate at the first XY coordinate and the sharpest Z coordinate at the second XY coordinate to measure the flatness of the detection stage along the Z-axis. In another aspect, provided herein are non-transitory computer-readable storage media comprising one or more programs for execution by one or more processors of an electronic device with an objective, a camera, a light source, and a detection stage, the one or more programs including instructions which, when executed by the one or more processors, cause the device to perform any of the methods described herein.

In another aspect, provided herein are electronic imaging devices comprising: an objective, a camera, a light source, a detection stage, and a processing unit, the processing unit coupled to the objective, the camera, the light source, and the detection stage, the processing unit configured to: using the objective, the light source, and the camera, obtain first data representing two or more images of a first XY coordinate on a substantially flat substrate positioned on the detection stage, wherein the two or more images represent different Z coordinates at the first XY coordinate; based on the first data, determine a sharpest Z coordinate at the first XY coordinate based on sharpness of the two or more images representing different Z coordinates at the first XY coordinate; using the objective, the light source, and the camera, obtain second data representing two or more images of a second XY coordinate spaced apart from the first XY coordinate on the substantially flat substrate, wherein the two or more images of the second XY coordinate represent different Z coordinates at the second XY coordinate; based on the second data, determine a sharpest Z coordinate at the second XY coordinate based on sharpness of the two or more images representing different Z coordinates at the second XY coordinate; and calculate a difference between the sharpest Z coordinate at the first XY coordinate and the sharpest Z coordinate at the second XY coordinate to measure the flatness of the detection stage along the Z-axis. In another aspect, provided herein are electronic imaging devices comprising: an objective, a camera, a light source, a detection stage, and a processing unit, the processing unit coupled to the objective, the camera, the light source, and the detection stage, the processing unit configured to perform any of the methods described herein.

I. General Techniques

The practice of the techniques described herein will employ, unless otherwise indicated, conventional techniques in polymer technology, microfabrication, micro-electro-mechanical systems (MEMS) fabrication, optical microscopy, photolithography, microfluidics, organic chemistry, biochemistry, oligonucleotide synthesis and modification, bioconjugate chemistry, nucleic acid hybridization, molecular biology, microbiology, genetics, recombinant DNA, and related fields as are within the skill of the art. The techniques are described in the references cited herein and are fully explained in the literature.

For molecular biology and recombinant DNA techniques, see, for example, (Maniatis, T. et al. (1982), *Molecular Cloning: A Laboratory Manual*, Cold Spring Harbor; Ausubel, F. M. (1987), *Current Protocols in Molecular Biology*, Greene Pub. Associates and Wiley-Interscience; Ausubel, F. M. (1989), *Short Protocols in Molecular Biology: A Compendium of Methods from Current Protocols in Molecular Biology*, Greene Pub. Associates and Wiley-Interscience; Sambrook, J. et al. (1989), *Molecular Cloning: A Laboratory Manual*, Cold Spring Harbor; Innis, M. A. (1990), *PCR Protocols: A Guide to Methods and Applications*, Academic Press; Ausubel, F. M. (1992), *Short Protocols in Molecular Biology: A Compendium of Methods from Current Protocols in Molecular Biology*, Greene Pub. Associates; Ausubel, F. M. (1995), *Short Protocols in Molecular Biology: A Compendium of Methods from Current Protocols in Molecular Biology*, Greene Pub. Associates; Innis, M. A. et al. (1995), *PCR Strategies, Academic Press*; Ausubel, F. M. (1999), *Short Protocols in Molecular Biology: A Compendium of Methods from Current Protocols in Molecular Biology*, Wiley, and annual updates.

For DNA synthesis techniques and nucleic acids chemistry, see for example, Gait, M. J. (1990), *Oligonucleotide Synthesis: A Practical Approach*, IRL Press; Eckstein, F. (1991), *Oligonucleotides and Analogues: A Practical Approach*, IRL Press; Adams, R. L. et al. (1992), *The Biochemistry of the Nucleic Acids*, Chapman & Hall; Shabarova, Z. et al. (1994), *Advanced Organic Chemistry of Nucleic Acids*, Weinheim; Blackburn, G. M. et al. (1996), *Nucleic Acids in Chemistry and Biology*, Oxford University Press; Hermanson, G. T. (1996), *Bioconjugate Techniques*, Academic Press).

For microfabrication, see for example, (Campbell, S. A. (1996), *The Science and Engineering of Microelectronic Fabrication*, Oxford University Press; Zaut, P. V. (1996), *Microarray Fabrication: a Practical Guide to Semiconductor Processing*, Semiconductor Services; Madou, M. J. (1997), *Fundamentals of Microfabrication*, CRC Press; Rai-Choudhury, P. (1997). Handbook of Microlithography, Micromachining, & Microfabrication: Microlithography).

II. Definitions

Before describing the invention in detail, it is to be understood that this invention is not limited to particular compositions or biological systems, which can, of course, vary. It is also to be understood that the terminology used herein is for the purpose of describing particular embodiments only, and is not intended to be limiting.

The term "microcarrier" as used herein may refer to a physical substrate onto which a capture agent may be coupled. A microcarrier of the present disclosure may take any suitable geometric form or shape. In some embodiments, the microcarrier may be disc-shaped. Typically the form or shape of a microcarrier will include at least one dimension on the order of $10^{-4}$ to $10^{-7}$ m (hence the prefix "micro").

The term "polymer" as used herein may refer to any macromolecular structure comprising repeated monomers. A polymer may be natural (e.g., found in nature) or synthetic (e.g., man-made, such as a polymer composed of non-natural monomer(s) and/or polymerized in a configuration or combination not found in nature).

The terms "substantially transparent" and "substantially non-transparent" as used herein may refer to the ability of light (e.g., of a particular wavelength, such as infrared, visible, UV, and so forth) to pass through a substrate, such as a polymer layer. A substantially transparent polymer may refer to one that is transparent, translucent, and/or pervious to light, whereas a substantially non-transparent polymer may refer to one that reflects and/or absorbs light. It is to be appreciated that whether a material is substantially transparent or substantially non-transparent may depend upon the wavelength and/or intensity of light illuminating the material, as well as the means detecting the light traveling through the material (or a decrease or absence thereof). In some embodiments, a substantially non-transparent material causes a perceptible decrease in transmitted light as compared to the surrounding material or image field, e.g., as imaged by light microscopy (e.g., bright field, dark field, phase contrast, differential interference contrast (DIC), Nomarski interference contrast (NIC), Nomarski, Hoffman modulation contrast (HMC), or fluorescence microscopy). In some embodiments, a substantially transparent material allows a perceptible amount of transmitted light to pass through the material, e.g., as imaged by light microscopy (e.g., bright field, dark field, phase contrast, differential interference contrast (DIC), Nomarski interference contrast (NIC), Nomarski, Hoffman modulation contrast (HMC), or fluorescence microscopy).

The term "analog code" as used herein may refer to any code in which the encoded information is represented in a non-quantized and/or non-discrete manner, e.g., as opposed to a digital code. For example, a digital code is sampled at discrete positions for a limited set of values (e.g., 0/1 type values), whereas an analog code may be sampled at a greater range of positions (or as a continuous whole) and/or may contain a wider set of values (e.g., shapes). In some embodiments, an analog code may be read or decoded using one or more analog shape recognition techniques.

The term "capture agent" as used herein is a broad term and is used in its ordinary sense to refer to any compound or substance capable of specifically recognizing an analyte of interest. In some embodiments, specific recognition may refer to specific binding. Non-limiting examples of capture agents include, for example, a DNA molecule, a DNA-analog-molecule, an RNA-molecule, an RNA-analog-molecule, a polynucleotide, a protein, an enzyme, a lipid, a phospholipid, a carbohydrate moiety, a polysaccharide, an antigen, a virus, a cell, an antibody, a small molecule, a bacterial cell, a cellular organelle, and an antibody fragment.

"Analyte," as used herein, is a broad term and is used in its ordinary sense as a substance the presence, absence, or quantity of which is to be determined, including, without limitation, to refer to a substance or chemical constituent in a sample such as a biological sample or cell or population of cells that can be analyzed. An analyte can be a substance for which a naturally occurring binding member exists, or for which a binding member can be prepared. Non-limiting examples of analytes include, for example, antibodies, antibody fragments, antigens, polynucleotides (such as a DNA molecule, DNA-analog-molecule, RNA-molecule, or RNA-analog-molecule), polypeptides, proteins, enzymes, lipids, phospholipids, carbohydrate moieties, polysaccharides, small molecules, organelles, hormones, cytokines, growth factors, steroids, vitamins, toxins, drugs, and metabolites of the above substances, as well as cells, bacteria, viruses, fungi, algae, fungal spores and the like.

The term "antibody" is used in the broadest sense and includes monoclonal antibodies (including full length antibodies which have an immunoglobulin Fc region), polyclonal antibodies, multispecific antibodies (e.g., bispecific antibodies, diabodies, and single-chain molecules), as well as antibody fragments (e.g., Fab, F(ab')$_2$, and Fv).

As used herein, "sample" refers to a composition containing a material, such as a molecule, to be detected. In one embodiment, the sample is a "biological sample" (i.e., any material obtained from a living source (e.g. human, animal, plant, bacteria, fungi, protist, virus)). The biological sample can be in any form, including solid materials (e.g. tissue, cell pellets and biopsies) and biological fluids (e.g. urine, blood, saliva, lymph, tears, sweat, prostatic fluid, seminal fluid, semen, bile, mucus, amniotic fluid and mouth wash (containing buccal cells)). Solid materials typically are mixed with a fluid. Sample can also refer to an environmental sample such as water, air, soil, or any other environmental source.

As used herein, a "substantially flat" substrate refers to a substrate that is level to a degree such that two points positioned on opposing ends of the substrate differ along a given axis (e.g., a Z-axis in a three-dimensional XYZ plane) by less than or equal to about 10-20% of the total thickness of the substrate along that axis (e.g., less than or equal to about 0.2-0.4 mm for a total thickness of about 2 mm). In certain embodiments, the substrate differs along the Z-axis by less than or equal to about 0.2 mm.

As used in this specification and the appended claims, the singular forms "a", "an" and "the" include plural referents unless the content clearly dictates otherwise. Thus, for example, reference to "a molecule" optionally includes a combination of two or more such molecules, and the like.

The term "about" as used herein refers to the usual error range for the respective value readily known to the skilled person in this technical field. Reference to "about" a value or parameter herein includes (and describes) embodiments that are directed to that value or parameter per se.

It is understood that aspects and embodiments of the invention described herein include "comprising," "consisting," and "consisting essentially of" aspects and embodiments.

III. Methods for Measuring Flatness

Provided herein are methods for measuring flatness of a detection stage. These methods may be used in any of the systems, devices, and computer-readable storage media described herein. The methods, devices, systems, and computer-readable storage media described herein may find use, inter alia, in measuring flatness of a detection stage used in multiplex assays for analyte detection, as well as electronic devices and systems related thereto.

In some embodiments, the methods of the present disclosure comprise obtaining two or more images of a first XY coordinate on a substantially flat substrate positioned on the detection stage, wherein the two or more images represent different Z coordinates at the first XY coordinate; determining a sharpest Z coordinate at the first XY coordinate based on sharpness of the two or more images representing different Z coordinates at the first XY coordinate; obtaining two or more images of a second XY coordinate spaced apart from the first XY coordinate on the substantially flat substrate, wherein the two or more images of the second XY coordinate represent different Z coordinates at the second XY coordinate; determining a sharpest Z coordinate at the second XY coordinate based on sharpness of the two or more images representing different Z coordinates at the second XY coordinate; and calculating a difference between the sharpest Z coordinate at the first XY coordinate and the sharpest Z coordinate at the second XY coordinate to measure the flatness of the detection stage along the Z-axis. In other embodiments, the methods of the present disclosure comprise, at an electronic device comprising one or more processors, obtaining first data representing two or more images of a first XY coordinate on a substantially flat substrate positioned on the detection stage, wherein the two or more images represent different Z coordinates at the first XY coordinate; based on the first data, determining a sharpest Z coordinate at the first XY coordinate based on sharpness of the two or more images representing different Z coordinates at the first XY coordinate; obtaining second data representing two or more images of a second XY coordinate spaced apart from the first XY coordinate on the substantially flat substrate, wherein the two or more images of the second XY coordinate represent different Z coordinates at the second XY coordinate; based on the second data, determining a sharpest Z coordinate at the second XY coordinate based on sharpness of the two or more images representing different Z coordinates at the second XY coordinate; and calculating a difference between the sharpest Z coordinate at the first XY coordinate and the sharpest Z coordinate at the second XY coordinate to measure the flatness of the detection stage along the Z-axis. In still other embodiments, the methods of the present disclosure comprise, at an electronic device comprising an objective, a light source, a camera, and a detection stage, positioning a substantially flat substrate on the detection stage perpendicular to the objective, the camera, and the light source; obtaining two or more images of a first XY coordinate on a substantially flat substrate positioned on the detection stage, wherein the two or more images represent different Z coordinates at the first XY coordinate; determining a sharpest Z coordinate at the first XY coordinate based on sharpness of the two or more images representing different Z coordinates at the first XY coordinate; obtaining two or more images of a second XY coordinate spaced apart from the first XY coordinate on the substantially flat substrate, wherein the two or more images of the second XY coordinate represent different Z coordinates at the second XY coordinate; determining a sharpest Z coordinate at the second XY coordinate based on sharpness of the two or more images representing different Z coordinates at the second XY coordinate; and calculating a difference between the sharpest Z coordinate at the first XY coordinate and the sharpest Z coordinate at the second XY coordinate to measure the flatness of the detection stage along the Z-axis.

In accordance with some embodiments, a flow diagram illustrating exemplary process 100 for measuring flatness of a detection stage is provided in FIG. 1. In some embodiments, process 100 may be performed using a system or device of the present disclosure, including without limitation a detection system or device with some or all of the exemplary components illustrated in FIG. 10. In some embodiments, process 100 may be performed to measure flatness of a detection stage used in a multiplex assay employing one or more encoded microcarriers of the present disclosure. Different embodiments of encoded microcarriers are described in greater detail infra in section IV. One non-limiting example of an encoded microcarrier is illustrated in FIGS. 2A-2D and further described infra.

At block 102, two or more images of a first XY coordinate on a substantially flat substrate positioned on the detection stage are obtained. Alternatively, at block 102, data representing two or more images of a first XY coordinate on a substantially flat substrate positioned on the detection stage are obtained. The two or more images represent different Z coordinates at the first XY coordinate. Stated another way, among the two or more images are a first image of a first Z coordinate at the first XY coordinate, and a second image of a second Z coordinate, different from the first Z coordinate, at the first XY coordinate. At block 104, a sharpest Z coordinate at the first XY coordinate is determined based on sharpness of the two or more images representing different Z coordinates at the first XY coordinate (or data representing them). At block 106, two or more images of a second XY coordinate on the substantially flat substrate positioned on the detection stage are obtained. Alternatively, at block 102, data representing two or more images of a second XY coordinate on the substantially flat substrate positioned on the detection stage are obtained. The two or more images represent different Z coordinates at the second XY coordinate. Stated another way, among the two or more images are a first image of a first Z coordinate at the second XY coordinate, and a second image of a second Z coordinate, different from the first Z coordinate, at the second XY coordinate, where the first and second XY coordinates are different. At block 108, a sharpest Z coordinate at the second XY coordinate is determined based on sharpness of the two or more images representing different Z coordinates at the second XY coordinate (or data representing them). At block 110, a difference between the sharpest Z coordinate at the first XY coordinate and the sharpest Z coordinate at the second XY coordinate is calculated. In some embodiments, this difference measures the flatness of the detection stage.

Some operations in process 100 may be combined, the order of some operations may be changed, and some operations may be omitted. In addition, one of skill in the art will appreciate that the order of operations depicted in FIG. 1 is exemplary and does not indicate that the depicted order is the only order in which the operations may be performed. One of ordinary skill in the art would recognize various ways to reorder the operations described herein, as well as excluding certain operations; for brevity, these permutations are not repeated herein.

In some embodiments, the methods include obtaining two or more images of a first XY coordinate. This first XY coordinate is on a substantially flat substrate, which is positioned on the detection stage for which flatness is measured. The two or more images represent different Z coordinates at the first XY coordinate. Stated another way, among the two or more images are a first image of a first Z coordinate at the first XY coordinate, and a second image of a second Z coordinate, different from the first Z coordinate, at the first XY coordinate.

The methods may further include obtaining two or more images of a second XY coordinate. The second XY coordinate is on the same substantially flat substrate as the first XY coordinate, which is positioned on the detection stage for which flatness is measured. The two or more images represent different Z coordinates at the second XY coordinate. Stated another way, among the two or more images are a first image of a first Z coordinate at the second XY coordinate, and a second image of a second Z coordinate, different from the first Z coordinate, at the second XY coordinate.

Certain aspects of the present disclosure relate to a three-dimensional Cartesian coordinate system having coordinates along X-, Y-, and Z-axes. As is known in the art, each position in the coordinate system may be described with three coordinates, corresponding to the X-, Y-, and Z-axes. This coordinate system is illustrated in FIGS. 3A & 3B. As shown in FIG. 3A, assay plate 302 (e.g., a 96-well assay plate) is positioned on top of detection stage 304 along the Z-axis. In some embodiments where the detection stage and assay plate are optically imaged, the Z-axis corresponds to a light path used for imaging (see, e.g., light 1008 in FIG. 10A).

In some embodiments, the one or more images comprise a bright-field image. In some embodiments, the one or more images comprise a fluorescence image. For example, any of the imaging components described herein may be used to obtain two or more images of an XY coordinate of the present disclosure. Any of the imaging techniques described herein may be used to obtain the image, including without limitation light microscopy (e.g., bright field, dark field, phase contrast, differential interference contrast (DIC), Nomarski interference contrast (NIC), Nomarski, Hoffman modulation contrast (HMC), or fluorescence microscopy).

A detection stage of the present disclosure may be used to position an assay plate of the present disclosure for imaging. In some embodiments, the assay plate rests atop the detection stage. In some embodiments, the detection stage is configured for an assay plate of particular dimensions, such as a standard 6-, 12-, 24-, 96-, 384-, or 1536-well plate. In some embodiments, the detection stage provides planar support and/or attachment to retain the assay plate in a fixed position during imaging. In some embodiments, the detection stage is open, or substantially transparent, in an area below one or more of the assay plate wells to allow for light transmission to the assay plate.

The detection stage may be configured to receive an assay plate. Numerous assay plates are known in the art. For example, assay plates may include without limitation microplates such as 6-, 12-, 24-, 60-, 72-, 96-, 384-, or 1536-well plates; or single-well assay plates such as Petri dishes. In some embodiments, the assay plate has a clear bottom (and a clear top, if a top is provided) for optical detection. Examples of suitable assay plates include without limitation clear polystyrene plates. Such plates are commercially available from Nunc™, Costar™, Corning®, Greiner Bio-One®, and the like.

In some embodiments, the detection stage is configured to receive a multiwell assay plate (e.g., comprising two or more wells). The wells may be of any shape. Typically in the art, assay plate wells are circular. In principal, however, the methods of the present disclosure may be applied to any geometric well shape. In some embodiments, the assay plate wells are flat-bottomed to allow all or substantially all of any assay materials (e.g., one or more microcarriers of the present disclosure) therein to reside on a common focal plane in the Z-axis.

FIG. 3B represents a 96-well assay plate with the XY coordinates of the four corner wells labeled (A1, A12, H1, and H12). For orientation purposes, and as conventionally used in the art, an exemplary 96-well assay plate labels the wells numerically from 1 to 12 across the X-axis and alphabetically from A to H across the Y-axis. As is shown in FIG. 3B, the position of each well has its own XY coordinate, and the Z-axis refers to the depth dimension of each well. In some embodiments described herein, an XY coordinate of the present disclosure may refer to a well of an assay plate, or the position that a well of an assay plate would occupy relative to a detection stage when the assay plate is positioned thereupon.

Figure 4A:
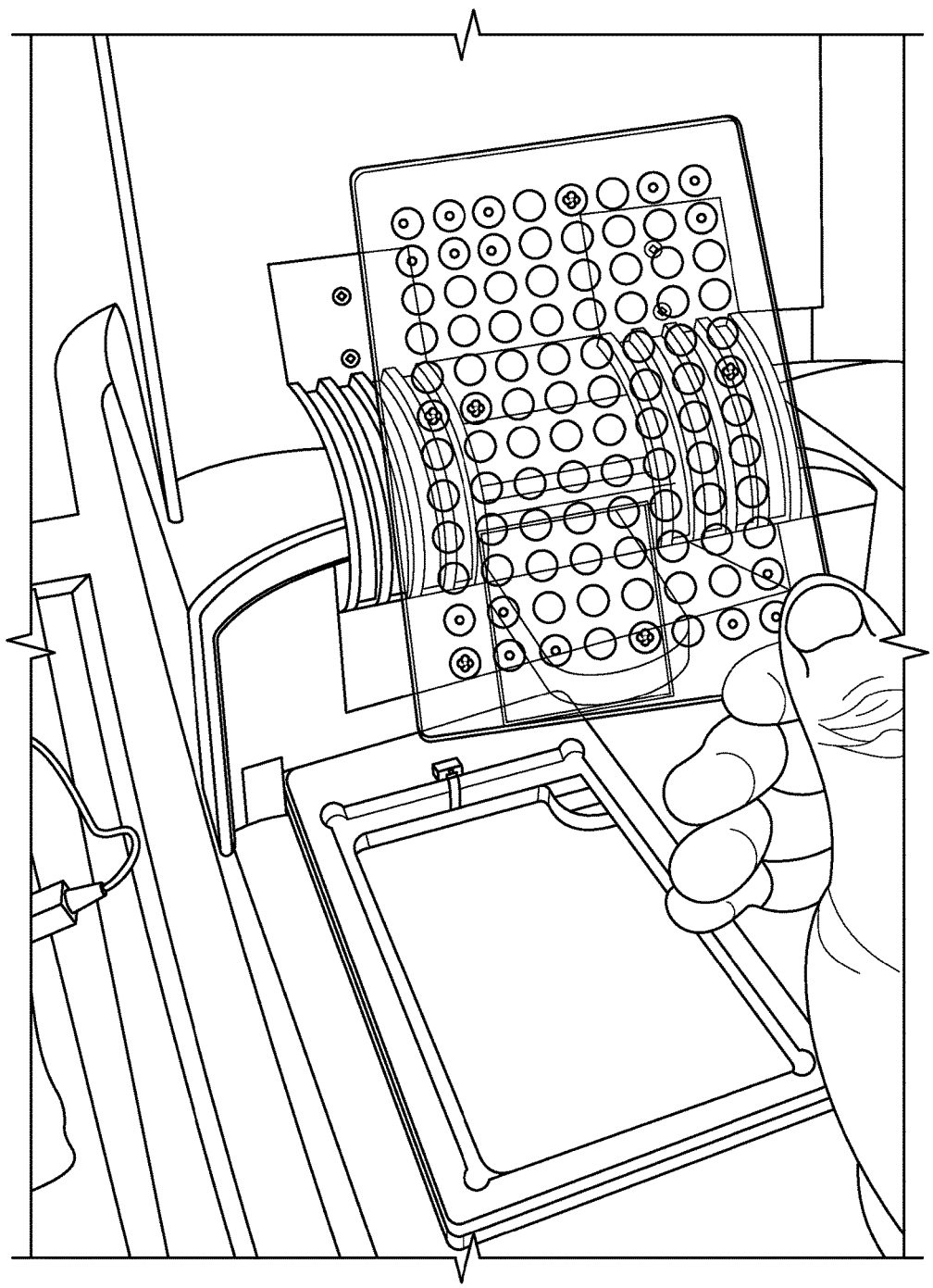
FIGS. 4A & 4B show an exemplary substrate and detection stage in accordance with some embodiments.
Figure 4B:
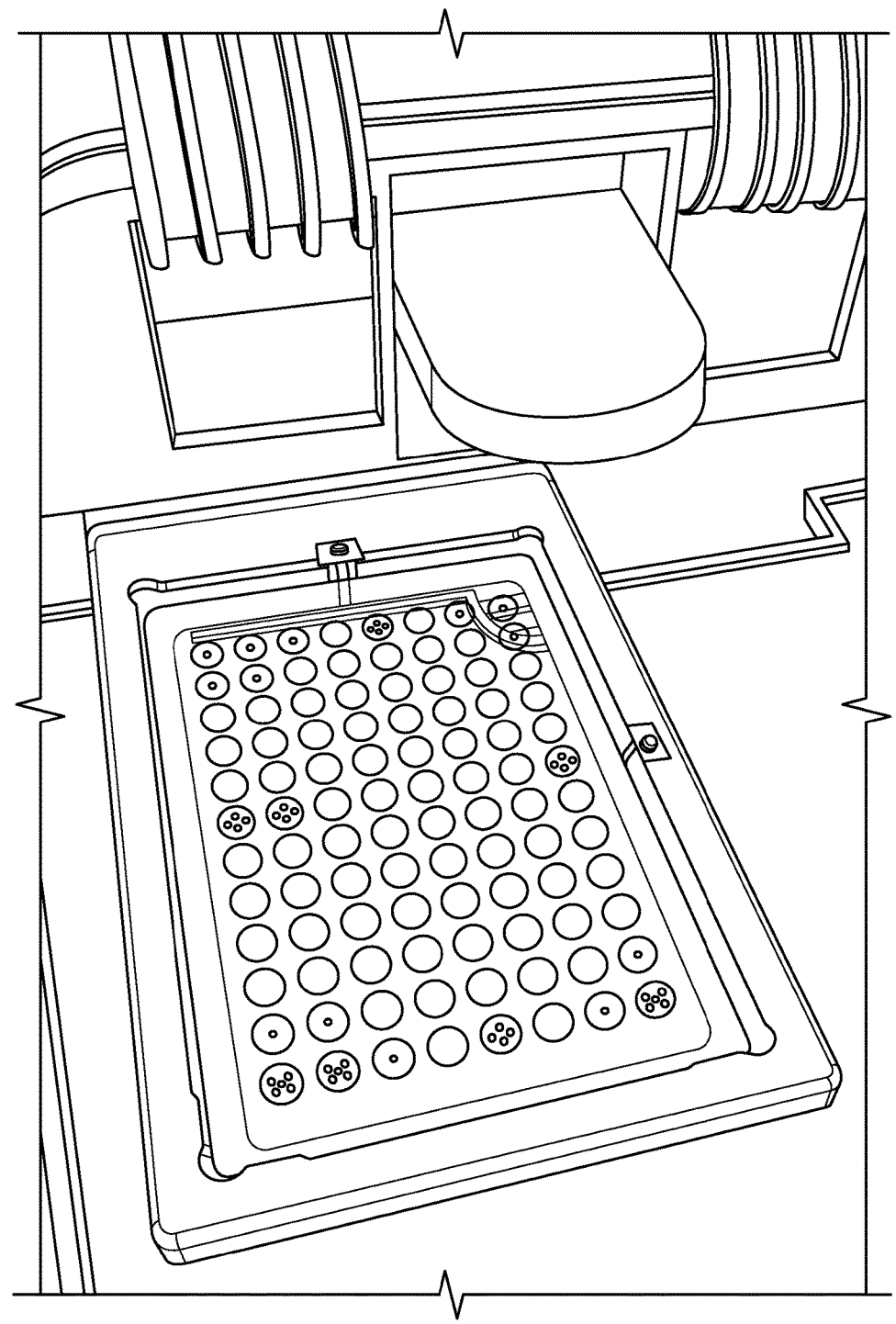

As described above, a detection stage of the present disclosure may be used to position an assay plate of the present disclosure, e.g., during an assay, such as those described herein. For example, a detection stage may be used to hold an assay plate during loading and/or scanning in a plate reader or other optical detection device. In some embodiments, the detection stage supports the perimeter of an assay plate (precise placement of support(s) may depend upon the shape of the assay plate) but has a substantially open area for optical imaging of the assay plate. Such a detection stage, in this example suitable for a rectangular assay plate, is illustrated in FIGS. 4A & 4B.

As described herein, a substantially flat substrate may be used, e.g., to measure the flatness of a detection stage. The flatness of the substrate may depend upon the type of assay plate and/or imaging technique. In some embodiments, the flatness of a substrate may refer to a difference in position along the Z-axis of opposing ends of the substrate. For example, with respect to the exemplary substrate 302 shown in FIG. 3B, flatness may refer, without limitation, to the difference between A1 and H1, between A1 and A12, and/or between A1 and H12 along the Z-axis. In some embodiments, a substantially flat substrate has opposing ends that differ along the Z-axis by less than or equal to about 20%, less than or equal to about 19%, less than or equal to about 18%, less than or equal to about 17%, less than or equal to about 16%, less than or equal to about 15%, less than or equal to about 14%, less than or equal to about 13%, less than or equal to about 12%, less than or equal to about 11%, less than or equal to about 10%, less than or equal to about 9%, less than or equal to about 8%, less than or equal to about 7%, less than or equal to about 6%, or less than or equal to about 5% of the total thickness of the substrate along that axis. For example, the thickness of the substrate may be about 2 mm. In some embodiments, the substantially flat substrate has opposing ends that differ along the Z-axis by less than or equal to about 0.4 mm, less than or equal to about 0.35 mm, less than or equal to about 0.3 mm, less than or equal to about 0.25 mm, less than or equal to about 0.2 mm, or less than or equal to about 0.15 mm.

In some embodiments, the substantially flat substrate may be made of a substantially transparent material, such as glass or any of the substantially transparent materials described herein or known in the art. In some embodiments, the substantially flat substrate may include two or more marks or other visual pattern(s), e.g., at the first and second XY coordinates. This is illustrated by the substrate shown in FIGS. 4A & 4B. These markings may be used as a focal point with which to measure sharpness at various Z coordinates, as described herein. In some embodiments, the substantially flat substrate comprises a glass plate with a visible pattern or marking on at least two XY coordinates. In some embodiments, the visible pattern corresponds to the position(s) of wells of a multiwell plate when positioned on the detection stage. In some embodiments, the visible pattern includes indications of one or more wells. Some or all of the wells may further include a visible pattern or marking for imaging, as shown in FIGS. 4A & 4B.

In some embodiments, a multiwell assay plate of the present disclosure may be used as a substantially flat substrate. For example, two or more wells of the multiwell assay plate may be used as XY coordinates of the present disclosure. In some embodiments, these wells may include one or more objects for imaging. Exemplary objects may include without limitation any of the microcarriers described herein.

Different shapes may be used for the substantially flat substrate. In some embodiments, the substrate is substantially rectangular. In other embodiments, the substrate is square, circular, triangular, or any other desired polygonal shape. In some embodiments, the shape of the substrate corresponds to the shape of a desired assay plate.

In some embodiments, a first and second XY coordinates of the present disclosure are spaced apart. It will be appreciated that various spacings may be used with the methods of the present disclosure. In some embodiments, it may be preferable to space two or more of the XY coordinates apart by positioning them at ends of the substantially flat substrate, which in some embodiments correspond to the edges of the detection stage, or the positions that would be occupied by the edges of an assay plate. Spacing the XY coordinates farther apart along the X- and/or Y-axis may allow the user to capture a greater extent of the spatial variations along the Z-axis of a detection stage, particularly if a variation along the Z-axis increases steadily across the X- and/or Y-axis.

For example, in some embodiments where the substrate is substantially rectangular, the first XY coordinate is positioned at a first corner of the substantially flat substrate, and the second XY coordinate is positioned at a second corner of the substantially flat substrate. Any pair of the four corners may be used. For example, with reference to corner A1 shown in FIG. 3B, the first and second XY coordinates may be A1 and A12, A1 and H1, or A1 and H12.

In some embodiments, the methods of the present disclosure may be repeated for one or more additional XY coordinates (e.g., a third XY coordinate, fourth XY coordinate, etc.). These additional XY coordinates may substitute for one or more of the first and second XY coordinates in one or more repeated steps of the method. For example, in FIG. 3B, two or more images at different Z coordinates of each of the four corners (e.g., A1, A12, H1, and H12) may be obtained, and a sharpest Z coordinate at each of the XY coordinates may be determined and used to measure flatness as described herein.

Figure 7A:
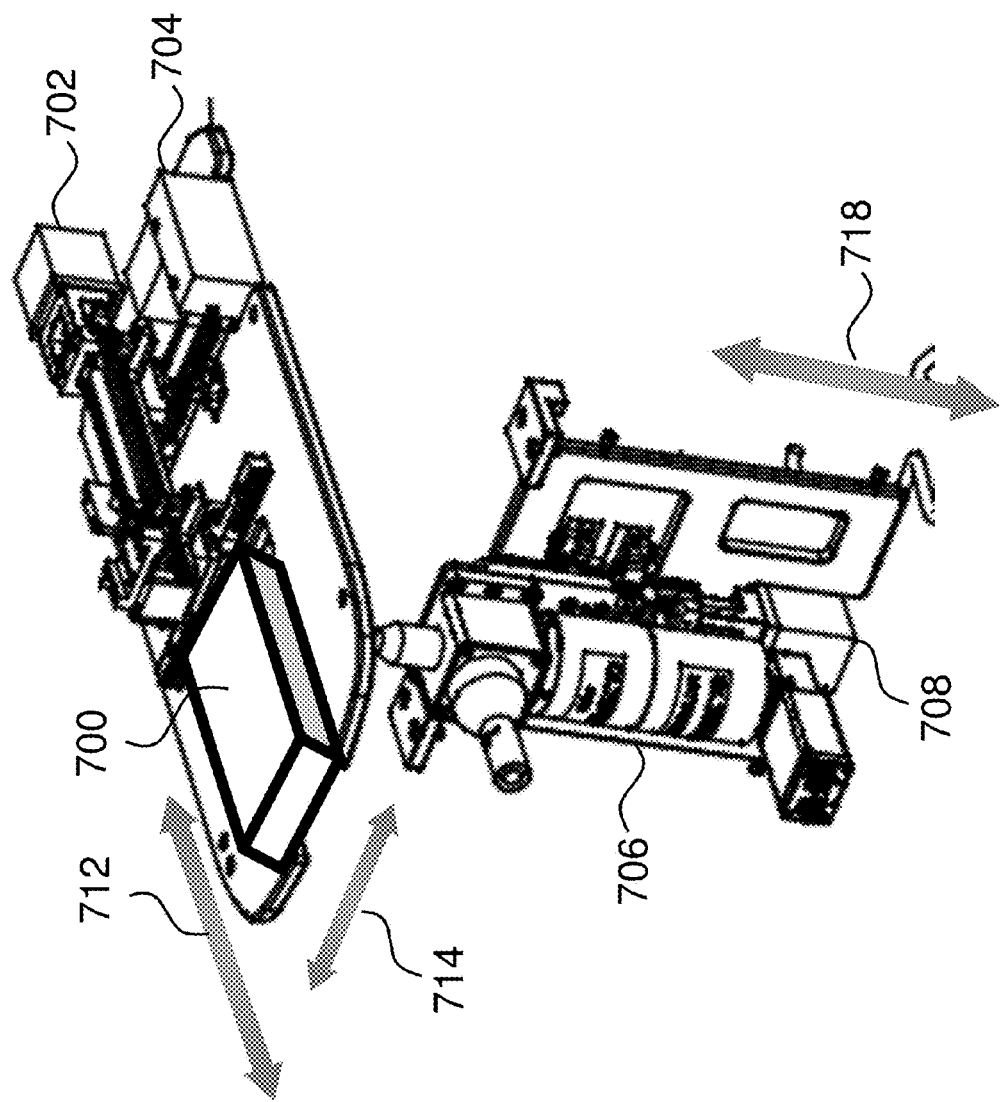

In some embodiments, the detection stage may be a movable detection stage. For example, the detection stage may be coupled to one or more motors configured to move the detection stage along one or more of the X-, Y-, and Z-axes. An example is illustrated in FIG. 7A. FIG. 7A depicts detection stage 700, which is coupled to motors 702 and 704 that allow stage 700 to move along the X- and Y-axes, as depicted by arrows 712 and 714. Aligned with stage 700 is imaging system 706 (e.g., any of the imaging systems of the present disclosure). In this example, imaging system 706 is coupled to motor 708, which allows imaging system 706 to move along the Z-axis, as depicted by arrow 718.

In some embodiments, an imaging system or component thereof (e.g., an objective and/or lens of the present disclosure) is movable. For example, the objective may be coupled to one or more motors configured to move the objective along one or more of the X-, Y-, and Z-axes. As a non-limiting example, the objective/imaging system (e.g., 706) may be coupled to a motor configured to move the objective/imaging system along the Z-axis, and obtaining the two or more images representing different Z coordinates at the second XY coordinate comprises re-positioning the objective along the Z-axis (e.g., using the motor, such as motor 708 in FIG. 7A). It is to be understood that one or more motors configured to move the detection stage may be combined with one or more motors configured to move the objective or imaging system in any combination, such that the detection stage and/or objective or imaging system may be moved along any or all of the X-, Y-, and/or Z-axes.

In some embodiments, the detection stage may be adjusted along the Z-axis. For example, based on the calculated flatness, the detection stage may be adjusted to increase its flatness, e.g., to reduce a calculated difference between sharpest Z coordinates at two or more XY coordinates. An exemplary means for adjusting the detection stage is illustrated in FIG. 7B. FIG. 7B shows two views of detection stage 700, which is coupled to imaging system 706. Screws 720 are attached to detection stage 700. One or more of screws 720 may be adjusted, manually or in automated fashion, to adjust stage 700 along the Z-axis. For example, in some embodiments, flatness detection is done during assembly. After calculation of flatness, screws 720 may be adjusted to fix the stage during assembly to make sure the flatness is within a desired range.

In some embodiments, the methods include determining a sharpest (or sharper, if two images are used) Z coordinate at the first XY coordinate based on sharpness of the two or more images representing different Z coordinates. That is, the sharpness may be determined for at least two of the two or more images representing different Z coordinates. In some embodiments, sharpness is determined for each of the two or more images representing different Z coordinates.

Exemplary methods for determining sharpness are known in the art and described herein. In some embodiments, a sharpness function may be used to determine sharpness. In some embodiments, the sharpness function includes, without limitation, one or more of Vollath's F4, Vollath's F5, sharpness variance, sharpness gradient, sharpness entropy, Bayes spectral entropy (BSE), mid frequency discrete cosine transform (DCT), robust discrete cosine transform (RDCT), sum of differences across rows (SMD1), sum of differences across rows and columns (SMD2), sum of modified Laplacians (SML), squared gradient, or modulation transfer function (MTF). Further description of sharpness determination and functions may be found, e.g., in Yousefi, S. et al. (2011) *IEEE Transactions on Consumer Electronics* 57(3):1003-1009; and imaging.utk.edu/publications/papers/2006/SPIE06-yy.pdf. In certain embodiments, a modulation transfer function (MTF) is used to determine sharpness. In some embodiments, the sharpness of Z coordinates at multiple XY coordinates are determined using the same function.

In some embodiments, an image sharpness (e.g., as determined by a function above, such as MTF) is used to calculate a focal length of a Z coordinate, e.g., at an XY coordinate of the present disclosure. This is illustrated in FIGS. 5A & 5B. FIG. 5A illustrates an imaging system with objective 502, and substrate 504 (which is positioned on a detection stage. Focal length 506 represents the focal length at a Z coordinate at XY coordinate 508. FIG. 5B shows three scenarios for determining a focal length at position 1 or 2 of 504 using objective 502. In the middle, position 2 has a smaller focal length than position 1. On the right, position 1 has a smaller focal length than position 2. On the left, positions 1 and 2 have the same focal length, indicating that the detection stage is flat.

In some embodiments, the methods include calculating a difference between the sharpest Z coordinate at the first XY coordinate and the sharpest Z coordinate at the second XY coordinate to measure the flatness of the detection stage along the Z-axis.

Figure 6:
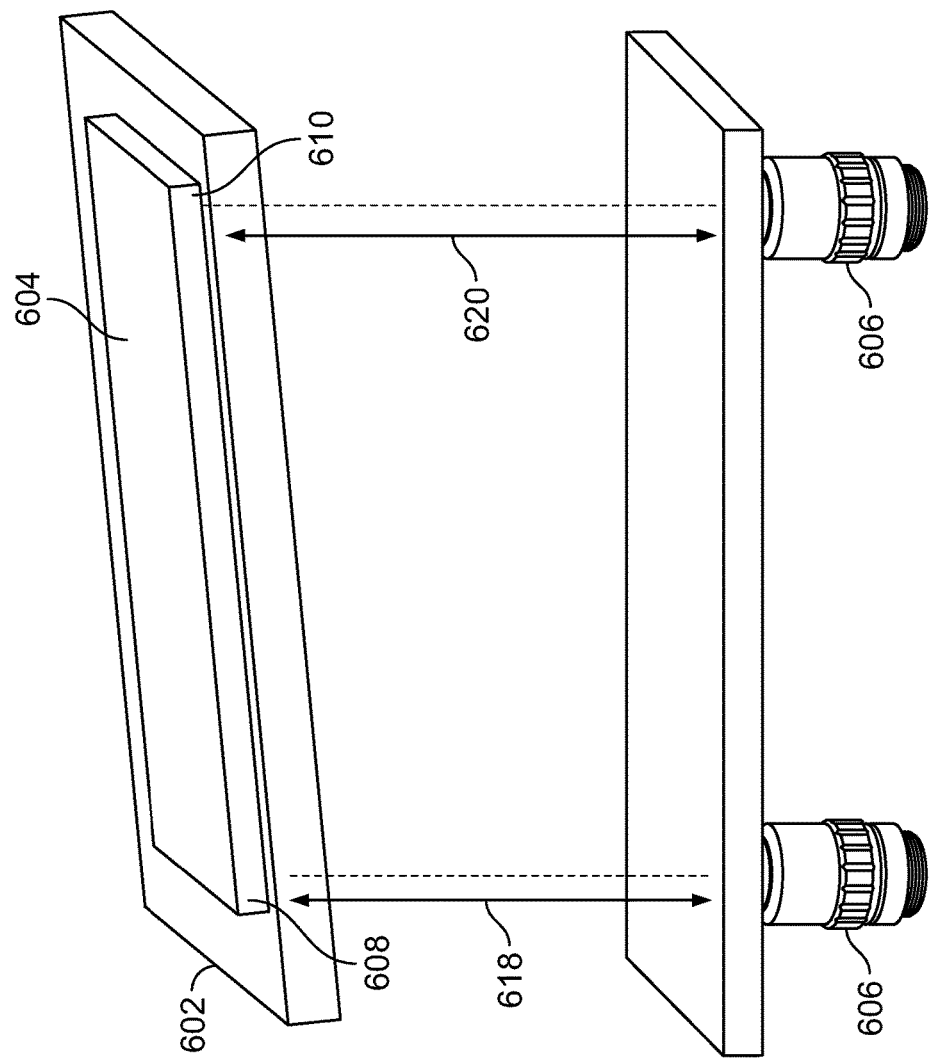
FIG. 6 illustrates measurement of Z coordinates at multiple XY coordinates in accordance with some embodiments.

FIG. 6 provides another illustration of the methods described herein. Shown are detection stage 602, substrate 604, and objective 606. Two XY coordinates of substrate 604 are used: 608, and 610. First, objective 606 obtains two or more images at different Z coordinates of 608. The images are used to determine a sharpest Z coordinate at 608. Optionally, the focal length 618 of the sharpest Z coordinate at 608 is determined. Second, objective 606 obtains two or more images at different Z coordinates of 610. The images are used to determine a sharpest Z coordinate at 610. Optionally, the focal length 620 of the sharpest Z coordinate at 610 is determined. Finally, the difference between the sharpest Z coordinates at 608 and 610 (e.g., the difference between 618 and 620) is calculated to measure the flatness of 602.

In some embodiments, the methods further include one or more steps of an assay of the present disclosure, e.g., an assay described in section VI).

IV. Encoded Microcarriers

Certain aspects of the present disclosure relate to encoded microcarriers. It will be appreciated by one of skill in the art that the methods and systems described herein may be suitable for use with a variety of encoded microcarriers. It is thought that the methods, devices, computer-readable storage media, systems described herein may be applied to any type of microcarrier that uses light-based detection. For example, they may be used to calibrate a detection stage to improve the accuracy and/or speed of a multiplex assay using encoded microcarriers on an assay plate (e.g., by increasing flatness, thereby reducing the need for Z-axis focusing and/or adjustment).

In some embodiments, the encoded microcarrier is a light transmitted assay bead or digital magnetic microbead.

Examples of such beads may be found, e.g., in U.S. Pat. Nos. 7,858,307; 7,871,770; 8,148,139; and U.S. PG Publication No. US20110007955.

In some embodiments, the encoded microcarrier comprises a substantially transparent polymer layer having a first surface and a second surface, the first and the second surfaces being parallel to each other; a substantially non-transparent polymer layer, wherein the substantially non-transparent polymer layer is affixed to the first surface of the substantially transparent polymer layer and encloses a center portion of the substantially transparent polymer layer, and wherein the substantially non-transparent polymer layer comprises a two-dimensional shape representing an analog code; and a capture agent for capturing an analyte, wherein the capture agent is coupled to at least one of the first surface and the second surface of the substantially transparent polymer layer in at least the center portion of the substantially transparent polymer layer. In some embodiments, the microcarrier further includes a second substantially transparent polymer layer aligned with and affixed to the first substantially transparent polymer layer. In some embodiments, the first and second substantially transparent polymer layers each have a center portion, and the center portions of both the first and second substantially transparent polymer layers are aligned. In some embodiments, the microcarrier further includes a magnetic, substantially non-transparent layer that encloses the center portions of both the first and second substantially transparent polymer layers. In some embodiments, the magnetic, substantially non-transparent layer is affixed between the first and second substantially transparent polymer layers. In some embodiments, the magnetic, substantially non-transparent layer is between the substantially non-transparent polymer layer and the center portions of both the first and second substantially transparent polymer layers. An exemplary microcarrier of this type, which includes some of the optional microcarrier aspects and features described herein, is illustrated in FIGS. 2A-2D.

Turning now to FIGS. 2A and 2B, an exemplary microcarrier 200 is shown. Microcarrier 200 includes substantially transparent polymer layer 202 and substantially non-transparent polymer layer 204. In addition, microcarrier 200 includes magnetic layer 206. As shown in FIG. 2A, magnetic layer 206 may be shaped as a ring between center portion 208 and substantially non-transparent layer 204.

FIG. 2B shows that magnetic layer 206 may be embedded within layer 202. Layer 202 may also include more than one layer, such that magnetic layer 206 is sandwiched between two substantially transparent polymer layers (e.g., as in FIG. 2B). Alternatively, magnetic layer 206 may be affixed to the same surface of layer 202 as layer 204, or magnetic layer 206 may be affixed to the surface of layer 202 opposite layer 204. In some embodiments, magnetic layer 206 may include nickel.

Magnetic layer 206 bestows magnetic properties onto microcarrier 200, which advantageously may be used for many applications. For example, microcarrier 200 may be affixed to a surface by magnetic attraction during a washing step, allowing for effective washing without losing or otherwise disrupting the microcarriers.

Figure 2D:
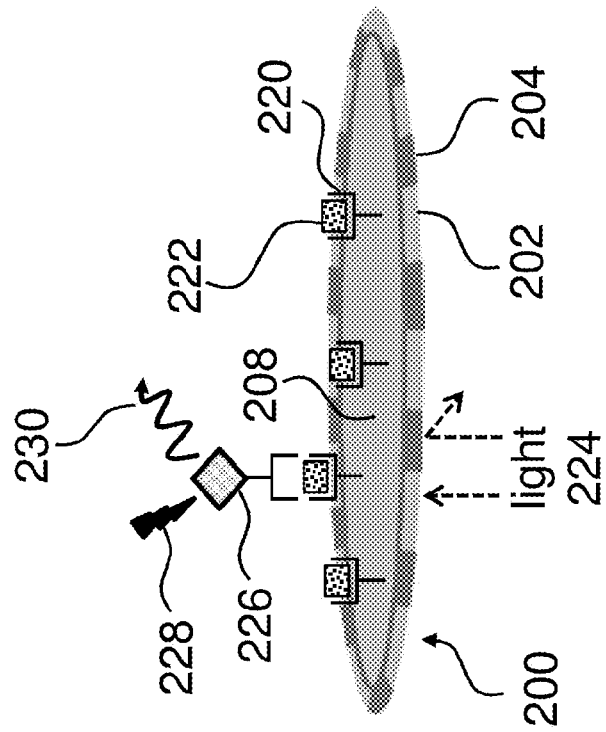
FIGS. 2C & 2D show an exemplary assay for analyte detection using an exemplary microcarrier.
Figure 2C:
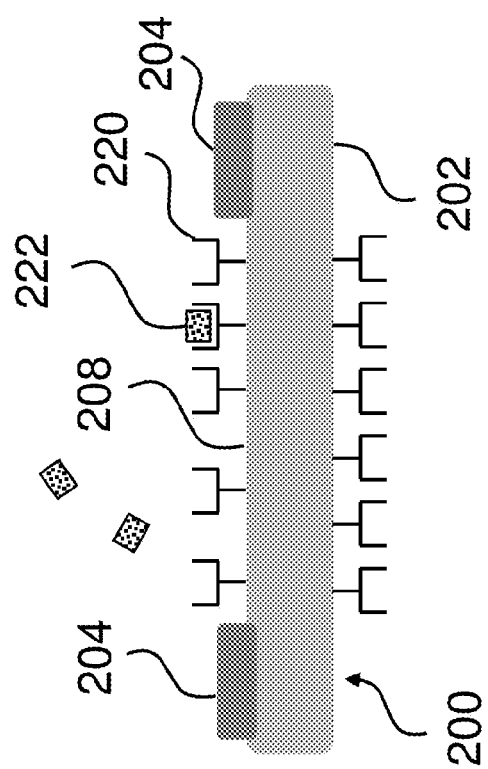

In addition to its magnetic properties, layer 206 is also substantially non-transparent. When imaged as shown in FIGS. 2C and 2D (described below), layer 206 will block, either in part or in whole, transmitted light, thereby creating a pattern for imaging. As shown in FIG. 2A, layer 206 is also asymmetric—in this example, it includes gap 210. This asymmetry creates an orientation indicator that can be imaged. Advantageously, an orientation indicator may be utilized during image recognition to orient the two-dimensional shape created by imaging layer 204 in a uniform orientation for easier analog code recognition. This allows microcarriers imaged in any orientation to be decoded.

FIGS. 2C and 2D show an exemplary assay using microcarrier 200 for analyte detection. FIG. 2C shows that microcarrier 200 may include capture agent 220 coupled to one or more surfaces in at least center portion 208. Microcarrier 200 is contacted with a solution containing analyte 222, which is captured by capture agent 220. As described herein, various capture agents may be used to capture different types of analytes, ranging from small molecules, nucleic acids, and proteins (e.g., antibodies) to organelles, viruses, and cells. FIG. 2C illustrates a single microcarrier species (i.e., microcarrier 200), which captures analyte 222, but in a multiplex assay multiple microcarrier species are used, each species having a particular capture agent that recognizes a specific analyte.

FIG. 2D illustrates an exemplary process for "reading" microcarrier 200, e.g., using the methods, systems, and/or devices described herein. This process includes two steps that may be accomplished simultaneously or separately. First, the capture of analyte 222 by capture agent 220 is detected. In the example shown in FIG. 2D, detection agent 226 binds to analyte 222. Analyte not captured by a capture agent coupled to microcarrier 200 may have been washed off prior to detection, such that only analytes bound to microcarrier 200 are detected. Detection agent 226 also includes a reagent for detection. As one example, detection agent 226 may include a fluorophore that, when excited by light 228 (e.g., supplied by excitation light 514 shown in FIG. 5A) at a wavelength within the excitation spectrum of the fluorophore, emits a photon such as light 230 (e.g., emitted light 518 in FIG. 5A). Light 230 may be detected by any suitable detection means, such as camera 510 (e.g., a CCD camera).

In addition, microcarrier 200 is read for its unique identifier. In the example shown in FIG. 2D, light 224 (e.g., supplied by bright-field light 508 shown in FIG. 5A) is used to illuminate the field containing microcarrier 200 (in some embodiments, light 224 may have a different wavelength than lights 228 and 230; for example, light 224 may be bright-field or white light). When light 224 illuminates the field containing microcarrier 200, it passes through substantially transparent polymer layer 202 but is blocked by substantially non-transparent polymer layer 204, as shown in FIG. 2D. This generates a light pattern that can be imaged, for example, by light microscopy (e.g., using bright-field microscopy). This light pattern is based on the two-dimensional shape (i.e., digital or analog code) of microcarrier 200. Standard image recognition techniques may be used to decode the analog code represented by the image of microcarrier 200, as described herein.

The analyte detection and identifier imaging steps may occur in any order, or simultaneously. Advantageously, both detection steps shown in FIG. 2D may be accomplished on one imaging device, such as the devices and systems of the present disclosure. As one example, a microscope capable of both fluorescence and light (e.g., bright field) microscopy may be used to quantify the amount of analyte 222 bound to microcarrier 200 (e.g., as detected by detection agent 226) and image the analog code created by layers 202 and 204. This allows for a more efficient assay process with fewer equipment requirements.

In some embodiments, the magnetic, substantially non-transparent layer is between about 50 nm and about 10 µm in thickness. In some embodiments, the thickness of the magnetic, substantially non-transparent layer is less than about any of the following thicknesses (in nm): 10000, 9500, 9000, 8500, 8000, 7500, 7000, 6500, 6000, 5500, 5000, 4500, 4000, 3500, 3000, 2500, 2000, 1500, 1000, 950, 900, 850, 800, 750, 700, 650, 600, 550, 500, 450, 400, 350, 300, 250, 200, 150, or 100. In some embodiments, the thickness of the magnetic, substantially non-transparent layer is greater than about any of the following thicknesses (in nm): 50, 100, 150, 200, 250, 300, 350, 400, 450, 500, 550, 600, 650, 700, 750, 800, 850, 900, 950, 1000, 1500, 2000, 2500, 3000, 3500, 4000, 4500, 5000, 5500, 6000, 6500, 7000, 7500, 8000, 8500, 9000, or 9500. That is, the thickness of the magnetic, substantially non-transparent layer may be any of a range of thicknesses (in nm) having an upper limit of 10000, 9500, 9000, 8500, 8000, 7500, 7000, 6500, 6000, 5500, 5000, 4500, 4000, 3500, 3000, 2500, 2000, 1500, 1000, 950, 900, 850, 800, 750, 700, 650, 600, 550, 500, 450, 400, 350, 300, 250, 200, 150, or 100 and an independently selected lower limit of 50, 100, 150, 200, 250, 300, 350, 400, 450, 500, 550, 600, 650, 700, 750, 800, 850, 900, 950, 1000, 1500, 2000, 2500, 3000, 3500, 4000, 4500, 5000, 5500, 6000, 6500, 7000, 7500, 8000, 8500, 9000, or 9500, wherein the lower limit is less than the upper limit.

In some embodiments, the magnetic, substantially non-transparent layer is about 0.1 µm in thickness. In some embodiments, the magnetic, substantially non-transparent layer is about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, or about 10 µm in thickness. In some embodiments, the thickness of the magnetic, substantially non-transparent layer is about 0.01 µm, about 0.02 µm, about 0.03 µm, about 0.04 µm, about 0.05 µm, about 0.06 µm, about 0.07 µm, about 0.08 µm, about 0.09 µm, about 0.1 µm, about 0.11 µm, about 0.12 µm, about 0.13 µm, about 0.14 µm, about 0.15 µm, about 0.16 µm, about 0.17 µm, about 0.18 µm, about 0.19 µm, about 0.20 µm, about 0.25 µm, about 0.30 µm, about 0.35 µm, about 0.40 µm, about 0.45 µm, or about 0.50 µm.

In some embodiments, the microcarrier further includes an orientation indicator for orienting the analog code of the substantially non-transparent polymer layer. Any feature of the microcarrier that is visible and/or detectable by imaging (e.g., a form of microscopic or other imaging described herein) and/or by image recognition software may serve as an orientation indicator. An orientation indicator may serve as a point of reference, e.g., for an image recognition algorithm, to orient the image of an analog code in a uniform orientation (i.e., the shape of the substantially non-transparent polymer layer). Advantageously, this simplifies image recognition, as the algorithm would only need to compare the image of a particular analog code against a library of analog codes in the same orientation, and not against a library including all analog codes in all possible orientations. In some embodiments, the orientation indicator may be independent of the substantially non-transparent polymer layer. For example, it may be formed as a part of a magnetic layer and/or substantially transparent polymer layer. In other embodiments, the orientation indicator may be formed as part of the substantially non-transparent polymer layer. In some embodiments, the orientation indicator comprises an asymmetry of the magnetic, substantially non-transparent layer.

In some embodiments, the microcarrier further includes one or more columns projecting from a surface of the microcarrier (e.g., the top and/or bottom surface of the microcarrier). As used herein, a "column" may refer to any geometric shape that projects from the microcarrier surface and does not necessarily denote any regularity in dimensions, nor any cylindrical character. For example, the outer surface of a column may or may not be parallel with the microcarrier surface. Examples of columnar shapes that may project from a microcarrier include without limitation a rectangular prism, a triangle, a pyramid, a cube, a cylinder, a sphere or half-sphere, a cone, and so forth. In some embodiments, the one or more columns are not within a center portion of the first and/or the second substantially transparent polymer layer. In some embodiments, the one or more columns may project from an outside-facing surface (e.g., a surface not affixed to another layer) of one or more of the first and the second substantially transparent polymer layers. It is to be noted that any descriptions of microcarrier thickness herein do not include the one or more columns in the stated dimensions. That is to say, microcarrier thickness as described herein is independent of any optional columns projecting therefrom.

In some embodiments, the one or more columns are between about 1 µm and about 10 µm tall. In some embodiments, the one or more columns are about 1 µm tall, about 1.5 µm tall, about 2 µm tall, about 2.5 µm tall, about 3 µm tall, about 3.5 µm tall, about 4 µm tall, about 4.5 µm tall, about 5 µm tall, about 5.5 µm tall, about 6 µm tall, about 6.5 µm tall, about 7 µm tall, about 7.5 µm tall, about 8 µm tall, about 8.5 µm tall, about 9 µm tall, about 9.5 µm tall, or about 10 µm tall. In some embodiments, the one or more columns are less than about any of the following heights (in µm): 10, 9.5, 9, 8.5, 8, 7.5, 7, 6.5, 6, 5.5, 5, 4.5, 4, 3.5, 3, 2.5, 2, or 1.5. In some embodiments, the one or more columns are greater than about any of the following heights (in µm): 1, 1.5, 2, 2.5, 3, 3.5, 4, 4.5, 5, 5.5, 6, 6.5, 7, 7.5, 8, 8.5, 9, or 9.5. That is, the one or more columns can be any of a range of heights having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit.

In some embodiments, the one or more columns may be cylindrical in shape. In some embodiments, the one or more columns have a diameter between about 1 µm and about 10 µm. In some embodiments, the one or more columns have a diameter of about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, or about 10 µm. In some embodiments, the one or more columns have a diameter less than about any of the following lengths (in µm): 10, 9.5, 9, 8.5, 8, 7.5, 7, 6.5, 6, 5.5, 5, 4.5, 4, 3.5, 3, 2.5, 2, or 1.5. In some embodiments, the one or more columns have a diameter greater than about any of the following lengths (in µm): 1, 1.5, 2, 2.5, 3, 3.5, 4, 4.5, 5, 5.5, 6, 6.5, 7, 7.5, 8, 8.5, 9, or 9.5. That is, the one or more columns can have any of a range of diameters having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit. In other embodiments, the one or more columns may have roughly the same width as any diameter described supra, or a range of widths roughly the same as any range of diameters described supra, but the one or more columns may adopt the shape of an elliptical cylinder, parabolic cylinder, hyperbolic cylinder, or any other cylindrical or polyhedral shape described herein or known in the art.

In other embodiments, the encoded microcarrier comprises a substantially non-transparent polymer layer having a first surface and a second surface, the first and the second surfaces being parallel to each other, wherein an outline of the substantially non-transparent polymer layer comprises a two-dimensional shape that represents an analog code; and a capture agent for capturing an analyte, wherein the capture agent is coupled to at least one of the first surface and the second surface of the substantially non-transparent polymer layer in at least a center portion of the substantially non-transparent polymer layer.

In some embodiments, the microcarrier further includes one or more columns projecting from a surface of the substantially non-transparent polymer layer. As described in greater detail supra, a "column" may refer to any geometric shape that projects from the microcarrier surface and does not necessarily denote any regularity in columnar dimension(s). Any of the exemplary columnar shapes described above may be used.

In some embodiments, the one or more columns are between about 1 μm and about 10 μm tall. In some embodiments, the one or more columns are about 1 μm tall, about 1.5 μm tall, about 2 μm tall, about 2.5 μm tall, about 3 μm tall, about 3.5 μm tall, about 4 μm tall, about 4.5 μm tall, about 5 μm tall, about 5.5 μm tall, about 6 μm tall, about 6.5 μm tall, about 7 μm tall, about 7.5 μm tall, about 8 μm tall, about 8.5 μm tall, about 9 μm tall, about 9.5 μm tall, or about 10 μm tall. In some embodiments, the one or more columns are less than about any of the following heights (in μm): 10, 9.5, 9, 8.5, 8, 7.5, 7, 6.5, 6, 5.5, 5, 4.5, 4, 3.5, 3, 2.5, 2, or 1.5. In some embodiments, the one or more columns are greater than about any of the following heights (in μm): 1, 1.5, 2, 2.5, 3, 3.5, 4, 4.5, 5, 5.5, 6, 6.5, 7, 7.5, 8, 8.5, 9, or 9.5. That is, the one or more columns can be any of a range of heights having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit.

In some embodiments, the one or more columns may be cylindrical in shape. In some embodiments, the one or more columns have a diameter between about 1 μm and about 10 μm. In some embodiments, the one or more columns have a diameter of about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, or about 10 μm. In some embodiments, the one or more columns have a diameter less than about any of the following lengths (in μm): 10, 9.5, 9, 8.5, 8, 7.5, 7, 6.5, 6, 5.5, 5, 4.5, 4, 3.5, 3, 2.5, 2, or 1.5. In some embodiments, the one or more columns have a diameter greater than about any of the following lengths (in μm): 1, 1.5, 2, 2.5, 3, 3.5, 4, 4.5, 5, 5.5, 6, 6.5, 7, 7.5, 8, 8.5, 9, or 9.5. That is, the one or more columns can have any of a range of diameters having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit. In other embodiments, the one or more columns may have roughly the same width as any diameter described supra, or a range of widths roughly the same as any range of diameters described supra, but the one or more columns may adopt the shape of an elliptical cylinder, parabolic cylinder, hyperbolic cylinder, or any other cylindrical or polyhedral shape described herein or known in the art.

In some embodiments, the microcarrier further includes a magnetic layer comprising a magnetic material affixed to a surface of the substantially non-transparent polymer layer. In some embodiments, the magnetic layer does not extend beyond the two-dimensional shape of the substantially non-transparent polymer layer. That is to say, if the outline of the substantially non-transparent polymer layer were to be imaged, the resulting image would not be altered by the presence or absence of the magnetic layer. In some embodiments, the magnetic layer may include the one or more columns described above. That is, the one or more columns described above may be made of a magnetic material described herein.

In some embodiments, the microcarrier further includes an orientation indicator for orienting the analog code of the substantially non-transparent polymer layer. Any feature of the microcarrier that is visible and/or detectable by imaging (e.g., a form of microscopic or other imaging described herein) and/or by image recognition software may serve as an orientation indicator. An orientation indicator may serve as a point of reference, e.g., for an image recognition algorithm, to orient the image of an analog code in a uniform orientation (i.e., the shape of the substantially non-transparent polymer layer). Advantageously, this simplifies image recognition, as the algorithm would only need to compare the image of a particular analog code against a library of analog codes in the same orientation, and not against a library including all analog codes in all possible orientations. In some embodiments, the orientation indicator comprises an asymmetry of the outline of the substantially non-transparent polymer layer. For example, the orientation indicator may comprise a visible feature, such as an asymmetry, of the outline of the microcarrier.

In some embodiments, a substantially transparent polymer of the present disclosure comprises an epoxy-based polymer. Suitable epoxy-based polymers for fabrication of the compositions described herein include, but are not limited to, the EPON™ family of epoxy resins provided by Hexion Specialty Chemicals, Inc. (Columbus, Ohio) and any number of epoxy resins provided by The Dow Chemical Company (Midland, Mich.). Many examples of suitable polymers are commonly known in the art, including without limitation SU-8, EPON 1002F, EPON 165/154, and a poly (methyl methacrylate)/poly(acrylic acid) block copolymer (PMMA-co-PAA). For additional polymers, see, for example, Warad, *IC Packaging: Package Construction Analysis in Ultra Small IC Packaging*, LAP LAMBERT Academic Publishing (2010); *The Electronic Packaging Handbook*, CRC Press (Blackwell, ed.), (2000); and Pecht et al., *Electronic Packaging Materials and Their Properties*, CCR Press, $1^{st}$ ed., (1998). These types of materials have the advantage of not swelling in aqueous environments which ensures that uniform microcarrier size and shape are maintained within the population of microcarriers. In some embodiments, the substantially transparent polymer is a photoresist polymer. In some embodiments, the epoxy-based polymer is an epoxy-based, negative-tone, near-UV photoresist. In some embodiments, the epoxy-based polymer is SU-8.

In some embodiments, the substantially non-transparent polymer is a polymer described herein (e.g., SU-8) mixed with one or more non-transparent or colored dye(s). In other embodiments, the substantially non-transparent polymer is a black matrix resist. Any black matrix resist known in the art may be used; see, e.g., U.S. Pat. No. 8,610,848 for exemplary black matrix resists and methods related thereto. In some embodiments, the black matrix resist may be a photoresist colored with a black pigment, e.g., as patterned on the color filter of an LCD as part of a black matrix. Black matrix resists may include without limitation those sold by Toppan Printing Co. (Tokyo), Tokyo OHKA Kogyo (Kawasaki), and Daxin Materials Corp. (Taichung City, Taiwan).

In some embodiments, reference may be made to a center portion of one or more polymer layers. A center portion of the present disclosure may take any shape. In some embodiments, the shape of the center portion may reflect or correspond to the shape (e.g., outline) of the corresponding polymer layer. In other embodiments, the shape of the center portion may be independent of the shape (e.g., outline) of the corresponding polymer layer. For example, a center portion of a circular microcarrier surface may be circular in some embodiments and square in other embodiments. A center portion of a square microcarrier surface may be square in some embodiments and circular in other embodiments.

In some embodiments, a center portion of a polymer layer of the present disclosure is about 5%, about 7%, about 10%, about 15%, about 20%, about 25%, about 30%, about 35%, about 40%, about 45%, about 50%, about 55%, about 60%, about 65%, about 70%, about 75%, about 80%, about 85%, or about 90% of the surface area of the polymer layer. In some embodiments, a center portion of a polymer layer of the present disclosure is less than about any of the following fractions of the substantially transparent polymer layer (in %): 90, 85, 80, 75, 70, 65, 60, 55, 50, 45, 40, 35, 30, 25, 20, 15, 10, or 7. In some embodiments, a center portion of a polymer layer of the present disclosure is greater than about any of the following fractions of the substantially transparent polymer layer (in %): 5, 7, 10, 15, 20, 25, 30, 35, 40, 45, 50, 55, 60, 65, 70, 75, 80, or 85. That is, the fraction of the polymer layer surface area included in the center portion may be any of a range of percentages having an upper limit of 90, 85, 80, 75, 70, 65, 60, 55, 50, 45, 40, 35, 30, 25, 20, 15, 10, or 7 and an independently selected lower limit of 5, 7, 10, 15, 20, 25, 30, 35, 40, 45, 50, 55, 60, 65, 70, 75, 80, or 85, wherein the lower limit is less than the upper limit. In some embodiments, the center portion of a polymer layer comprises about 25% of the surface area of the polymer layer. In some embodiments, a center portion of a microcarrier surface includes the entire surface minus an outline portion of the microcarrier.

As described above, a microcarrier of the present disclosure may further include a magnetic layer, which may adopt a variety of shapes as described herein. In some embodiments, the magnetic layer may be a substantially non-transparent layer. In some embodiments, the magnetic layer may comprise a magnetic material. A magnetic layer of the present disclosure may be made of any suitable magnetic material, such as a material with paramagnetic, ferromagnetic, or ferrimagnetic properties. Examples of magnetic materials include without limitation iron, nickel, cobalt, and some rare earth metals (e.g., gadolinium, dysprosium, neodymium, and so forth), as well as alloys thereof. In some embodiments, the magnetic material comprises nickel, including without limitation elemental nickel and magnetic nickel alloys such as alnico and permalloy. The inclusion of a magnetic layer in a microcarrier of the present disclosure may be advantageous, e.g., in facilitating magnetic separation, which may be useful for washing, collecting, and otherwise manipulating one or more microcarriers.

As described above, in some embodiments, the magnetic layer may be affixed to a surface of the substantially transparent polymer layer and enclose a center portion of the substantially transparent polymer layer. In other embodiments, as described above, the magnetic layer may include one or more columns; i.e., the one or more columns described above may be made of a magnetic material described herein.

In some embodiments, a microcarrier of the present disclosure may be encoded with a barcode or other digital code. For example, the microcarrier may have a digitally coded structure that is partially transmissive and opaque to light. The systems described herein may be used to transmit light through the barcode (e.g., using an objective, detection stage, and light source of the present disclosure), capture an image of the barcode (e.g., using a camera of the present disclosure), and decode the barcode image (e.g., using one or more processors of the present disclosure). Barcode decoding methods are commonly known in the art. Examples of barcode-encoded microcarriers may be found, e.g., in U.S. Pat. Nos. 7,858,307; 7,871,770; 8,148,139; and U.S. PG Publication No. US20110007955.

In other embodiments, a microcarrier of the present disclosure may be encoded with an analog code, such as a two-dimensional shape. For example, a microcarrier of the present disclosure may be encoded with a substantially non-transparent layer that constitutes a two-dimensional shape. For example, as described above, the two-dimensional shape may constitute the shape of a substantially non-transparent layer that contrasts with a substantially transparent layer of the microcarrier, or it may constitute the shape of the microcarrier itself (e.g., the perimeter). Any two-dimensional shape that can encompass a plurality of resolvable and distinctive varieties may be used. In some embodiments, the two-dimensional shape comprises one or more of linear, circular, elliptical, rectangular, quadrilateral, or higher polygonal aspects, elements, and/or shapes.

In some embodiments, the two-dimensional shape of the substantially non-transparent polymer layer comprises a gear shape. A gear shape as used herein may refer to a plurality of shapes (e.g., gear teeth) arrayed on the perimeter of a substantially round, elliptical, or circular body, where at least two of the shapes of the plurality are spatially separated. In some embodiments, the gear shape comprises a plurality of gear teeth. In some embodiments, the analog code is represented by one or more aspects selected from the height of one or more gear teeth of the plurality, the width of one or more gear teeth of the plurality, the number of gear teeth in the plurality, and the arrangement of one or more gear teeth within the plurality. Advantageously, a gear shape encompasses multiple aspects, including the height of gear teeth, the width of gear teeth, the number of gear teeth, and the arrangement of gear teeth, that may be varied in order to generate a large diversity of potential unique two-dimensional shapes. It is to be appreciated, however, that since the gear shapes of the present disclosure are used for encoding and are not required to physically intermesh with another gear (e.g., as with mechanical gears that transmit torque), gear teeth of the present disclosure are not constrained by the need for identical or intermeshing shapes, either within one gear shape or between multiple gear shapes. As such, the variety of shapes that may be considered a gear tooth of the present disclosure is significantly greater than with a mechanical gear.

In some embodiments, the plurality of gear teeth comprises one or more gear teeth that are between about 1 μm and about 10 μm wide. In some embodiments, the plurality of gear teeth comprises one or more gear teeth that are about 1 μm wide, about 1.5 μm wide, about 2 μm wide, about 2.5 μm wide, about 3 μm wide, about 3.5 μm wide, about 4 μm wide, about 4.5 µm wide, about 5 µm wide, about 5.5 µm wide, about 6 µm wide, about 6.5 µm wide, about 7 µm wide, about 7.5 µm wide, about 8 µm wide, about 8.5 µm wide, about 9 µm wide, about 9.5 µm wide, or about 10 µm wide. In some embodiments, the plurality of gear teeth comprises one or more gear teeth that are less than about any of the following widths (in µm): 10, 9.5, 9, 8.5, 8, 7.5, 7, 6.5, 6, 5.5, 5, 4.5, 4, 3.5, 3, 2.5, 2, or 1.5. In some embodiments, the plurality of gear teeth comprises one or more gear teeth that are greater than about any of the following widths (in µm): 1, 1.5, 2, 2.5, 3, 3.5, 4, 4.5, 5, 5.5, 6, 6.5, 7, 7.5, 8, 8.5, 9, or 9.5. That is, the plurality of gear teeth may comprise one or more gear teeth that can be any of a range of widths having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit.

In some embodiments, the plurality of gear teeth comprises one or more gear teeth that are between about 1 µm and about 10 µm tall. In some embodiments, the plurality of gear teeth comprises one or more gear teeth that are about 1 µm tall, about 1.5 µm tall, about 2 µm tall, about 2.5 µm tall, about 3 µm tall, about 3.5 µm tall, about 4 µm tall, about 4.5 µm tall, about 5 µm tall, about 5.5 µm tall, about 6 µm tall, about 6.5 µm tall, about 7 µm tall, about 7.5 µm tall, about 8 µm tall, about 8.5 µm tall, about 9 µm tall, about 9.5 µm tall, or about 10 µm tall. In some embodiments, the plurality of gear teeth comprises one or more gear teeth that are less than about any of the following heights (in µm): 10, 9.5, 9, 8.5, 8, 7.5, 7, 6.5, 6, 5.5, 5, 4.5, 4, 3.5, 3, 2.5, 2, or 1.5. In some embodiments, the plurality of gear teeth comprises one or more gear teeth that are greater than about any of the following heights (in µm): 1, 1.5, 2, 2.5, 3, 3.5, 4, 4.5, 5, 5.5, 6, 6.5, 7, 7.5, 8, 8.5, 9, or 9.5. That is, the plurality of gear teeth may comprise one or more gear teeth that can be any of a range of heights having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit. It is to be appreciated that a gear tooth may have different measurable heights, depending on the point of reference, if the adjacent perimeter segments from which the gear tooth extends are uneven.

In some embodiments, the plurality of gear teeth comprises one or more gear teeth that are spaced between about 1 µm and about 10 µm apart. In some embodiments, the plurality of gear teeth comprises one or more gear teeth that are spaced about 1 µm apart, about 1.5 µm apart, about 2 µm apart, about 2.5 µm apart, about 3 µm apart, about 3.5 µm apart, about 4 µm apart, about 4.5 µm apart, about 5 µm apart, about 5.5 µm apart, about 6 µm apart, about 6.5 µm apart, about 7 µm apart, about 7.5 µm apart, about 8 µm apart, about 8.5 µm apart, about 9 µm apart, about 9.5 µm apart, or about 10 µm apart. In some embodiments, the plurality of gear teeth comprises one or more gear teeth that are spaced less than about any of the following widths apart (in µm): 10, 9.5, 9, 8.5, 8, 7.5, 7, 6.5, 6, 5.5, 5, 4.5, 4, 3.5, 3, 2.5, 2, or 1.5. In some embodiments, the plurality of gear teeth comprises one or more gear teeth that are spaced greater than about any of the following widths apart (in µm): 1, 1.5, 2, 2.5, 3, 3.5, 4, 4.5, 5, 5.5, 6, 6.5, 7, 7.5, 8, 8.5, 9, or 9.5. That is, the plurality of gear teeth may comprise one or more gear teeth that can be spaced any of a range of widths apart having an upper limit of 10, 9.5, 9, 8.5, 8, 7.5, 7, 6.5, 6, 5.5, 5, 4.5, 4, 3.5, 3, 2.5, 2, or 1.5 and an independently selected lower limit of 1, 1.5, 2, 2.5, 3, 3.5, 4, 4.5, 5, 5.5, 6, 6.5, 7, 7.5, 8, 8.5, 9, or 9.5, wherein the lower limit is less than the upper limit.

Analog-encoded microcarriers may be decoded, for example, by illuminating the microcarrier by passing light through the substantially transparent portions (e.g., substantially transparent polymer layer(s)) and/or the surrounding solution. The light may then fail to pass through, or pass through with a lower intensity or other appreciable difference, the substantially non-transparent portions (e.g., substantially non-transparent polymer layer(s)) of the microcarrier to generate an analog-coded light pattern corresponding to the microcarrier code. Decoding may employ any type of light microscopy, including without limitation one or more of: bright field, dark field, phase contrast, differential interference contrast (DIC), Nomarski interference contrast (NIC), Nomarski, Hoffman modulation contrast (HMC), or fluorescence microscopy. It will be appreciated by one of skill in the art that the decoding methods described herein may find use in decoding microcarriers in a multiplex assay, e.g., decoding two or more microcarriers or microcarrier species bearing different codes.

In certain embodiments, as described herein, the analog codes may be decoded using bright field microscopy, and analyte(s) may be detected using fluorescence microscopy. In some embodiments, decoding an analog code includes using analog shape recognition to identify the microcarrier. Conceptually, this decoding may involve imaging the analog code of each microcarrier (e.g., in a solution or sample), comparing each image against a library of analog codes, and matching each image to an image from the library, thus positively identifying the code. Optionally, as described herein, when using microcarriers that include an orientation indicator (e.g., an asymmetry), the decoding may further include a step of rotating each image to align with a particular orientation (based in part, e.g., on the orientation indicator). For example, if the orientation indicator includes a gap, the image could be rotated until the gap reaches a predetermined position or orientation (e.g., a 0° position of the image). In some embodiments, an image may be matched with an analog code (e.g., an image file from a library of image files, with each image file corresponding to a unique two-dimensional shape/analog code) within a predetermined threshold, e.g., that tolerates a predetermined amount of deviation or mismatch between the image and the exemplar analog code image. Such a threshold may be empirically determined and may naturally be based on the particular type of two-dimensional shapes used for the analog codes and the extent of variation among the set of potential two-dimensional shapes.

Various shape recognition software, tools, and methods are known in the art. Examples of such APIs and tools include without limitation Microsoft® Research FaceSDK, OpenBR, Face and Scene Recognition from ReKognition, Betaface API, and various ImageJ plugins. In some embodiments, the analog shape recognition may include without limitation image processing steps such as foreground extraction, shape detection, thresholding (e.g., automated or manual image thresholding), and the like.

In some embodiments, a microcarrier of the present disclosure is a substantially circular disc. As used herein, a substantially circular shape may refer to any shape having a roughly identical distance between all of the points of the shape's perimeter and the shape's geometric center. In some embodiments, a shape is considered to be substantially circular if the variation among any of the potential radii connecting the geometric center and a given point on the perimeter exhibit 10% or lesser variation in length. As used herein, a substantially circular disc may refer to any substantially circular shape wherein the thickness of the shape is significantly less than its diameter. For example, in some embodiments, the thickness of a substantially circular disc may be less than about 50%, less than about 40%, less than about 30%, less than about 20%, less than about 15%, less than about 10%, or less than about 5% of its diameter. In certain embodiments, the thickness of the substantially circular disc may about 20% of its diameter. It is to be appreciated that the microcarriers of the present disclosure whose outline is a gear shape may also be considered substantially circular discs; for example, the shape of the microcarrier excluding the one or more gear teeth may comprise a substantially circular disc.

In some embodiments, the microcarrier is less than about 200 µm in diameter. For example, in some embodiments, the diameter of the microcarrier is less than about 200 µm, less than about 180 µm, less than about 160 µm, less than about 140 µm, less than about 120 µm, less than about 100 µm, less than about 80 µm, less than about 60 µm, less than about 40 µm, or less than about 20 µm.

In some embodiments, the diameter of the microcarrier is about 180 µm, about 160 µm, about 140 µm, about 120 µm, about 100 µm, about 90 µm, about 80 µm, about 70 µm, about 60 µm, about 50 µm, about 40 µm, about 30 µm, about 20 µm, or about 10 µm. In certain embodiments, the microcarrier is about 60 µm in diameter.

In some embodiments, the microcarrier is less than about 50 µm in thickness. For example, in some embodiments, the thickness of the microcarrier is less than about 70 µm, about 60 µm, about 50 µm, about 40 µm, about 30 µm, less than about 25 µm, less than about 20 µm, less than about 15 µm, less than about 10 µm, or less than about 5 µm. In some embodiments, the thickness of the microcarrier is less than about any of the following thicknesses (in µm): 70, 65, 60, 55, 50, 45, 40, 35, 30, 25, 20, 15, 10, 9, 8, 7, 6, 5, 4, 3, or 2. In some embodiments, the thickness of the microcarrier is greater than about any of the following thicknesses (in µm): 1, 2, 3, 4, 5, 6, 7, 8, 9, 10, 15, 20, 25, 30, 35, 40, 45, 50, 55, 60, or 65. That is, the thickness of the microcarrier may be any of a range of thicknesses (in µm) having an upper limit of 70, 65, 60, 55, 50, 45, 40, 35, 30, 25, 20, 15, 10, 9, 8, 7, 6, 5, 4, 3, or 2 and an independently selected lower limit of 1, 2, 3, 4, 5, 6, 7, 8, 9, 10, 15, 20, 25, 30, 35, 40, 45, 50, 55, 60, or 65, wherein the lower limit is less than the upper limit.

In some embodiments, the thickness of the microcarrier is about 50 µm, about 45 µm, about 40 µm, about 35 µm, about 30 µm, about 25 µm, about 20 µm, about 19 µm, about 18 µm, about 17 µm, about 16 µm, about 15 µm, about 14 µm, about 13 µm, about 12 µm, about 11 µm, about 10 µm, about 9 µm, about 8 µm, about 7 µm, about 6 µm, about 5 µm, about 4 µm, about 3 µm, about 2 µm, or about 1 µm. In certain embodiments, the microcarrier is about 10 µm in thickness.

V. Systems, Devices, and Computer-Readable Storage Media for Measuring Flatness

Provided herein are systems, devices, and computer-readable storage media for measuring flatness of a detection stage. Any of the methods of the present disclosure may find use in one or more of the systems, devices, and computer-readable storage media described herein. Any of the components described herein (e.g., in section III) may find use in any of the systems or devices described herein. Any of the steps described below may find use in and/or be combined with any of the methods described herein (e.g., as described in section III).

Figure 8:
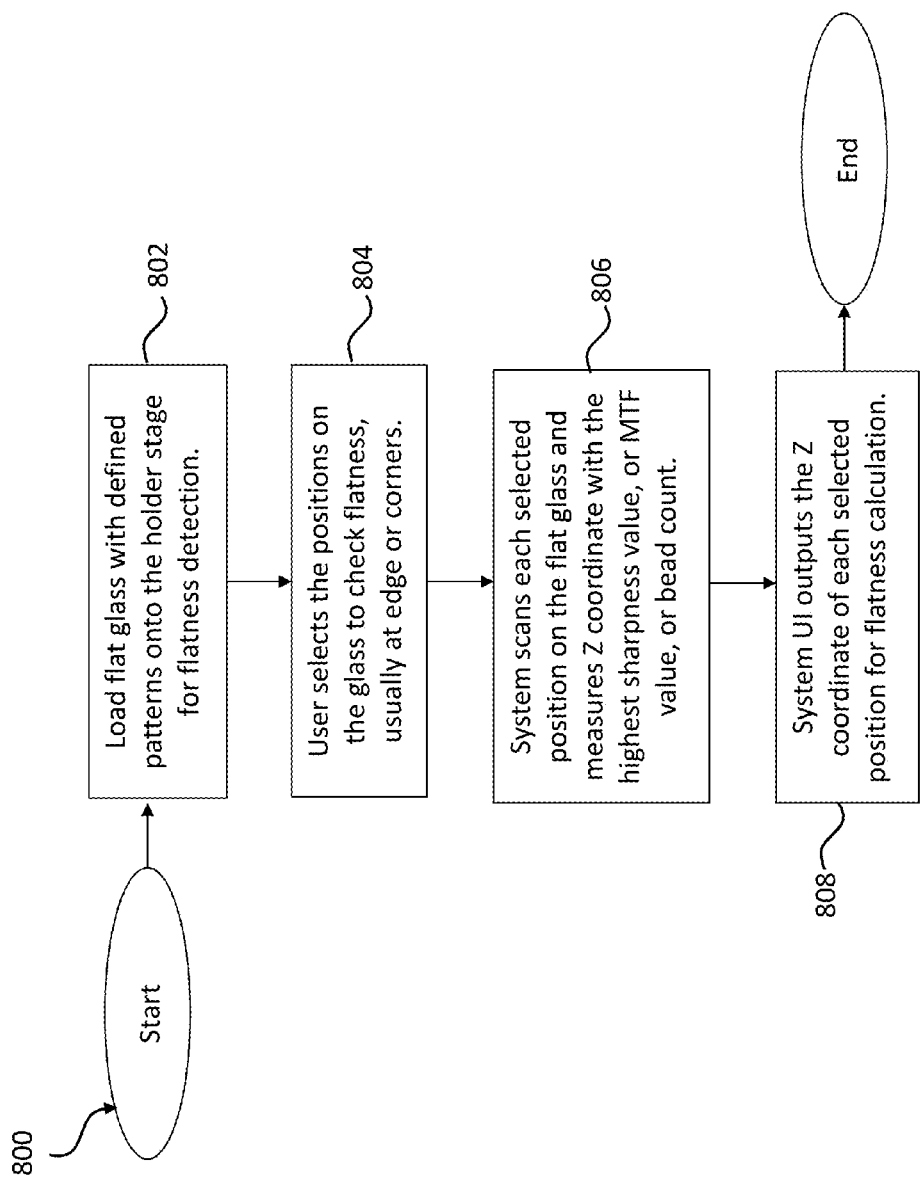
FIG. 8 is a flow diagram illustrating a method for measuring flatness of a detection stage in accordance with some embodiments.

Attention is now directed to the exemplary flow chart shown in FIG. 8. This depicts exemplary process 800 for measuring flatness. At block 802, the user positions a substantially flat substrate on the detection stage perpendicular to the objective, the camera, and the light source. As described above, the substrate may have one or more visible patterns or markings for measuring sharpness at various Z coordinates of XY coordinates. At block 804, the user selects two or more positions (e.g., XY coordinates) at which sharpness of Z coordinates are determined to measure flatness. In some embodiments, these are along the outside edges or corners of the substrate. Block 804 may be accomplished, e.g., using a system or computer-readable storage medium of the present disclosure through a user interface (UI) of the present disclosure. At block 806, a system or device of the present disclosure scans the two or more positions selected at block 804. A sharpest Z coordinate at the two or more positions is determined, e.g., as described supra. At block 808, a system or device of the present disclosure outputs the sharpest Z coordinate at the two or more positions. In some embodiments, the output may be displayed to the user, e.g., through a GUI, such as those illustrated and described in reference to FIGS. 9A & 9B. In some embodiments, a user may employ one or more steps of process 800 to validate that the detection stage has a threshold flatness before performing a multiplex assay of the present disclosure. In some embodiments, the user may employ one or more steps of process 800 to validate that the detection stage has a threshold flatness during setup of a device or system with a detection stage, e.g., any of the devices and systems described herein.

Figure 9A:
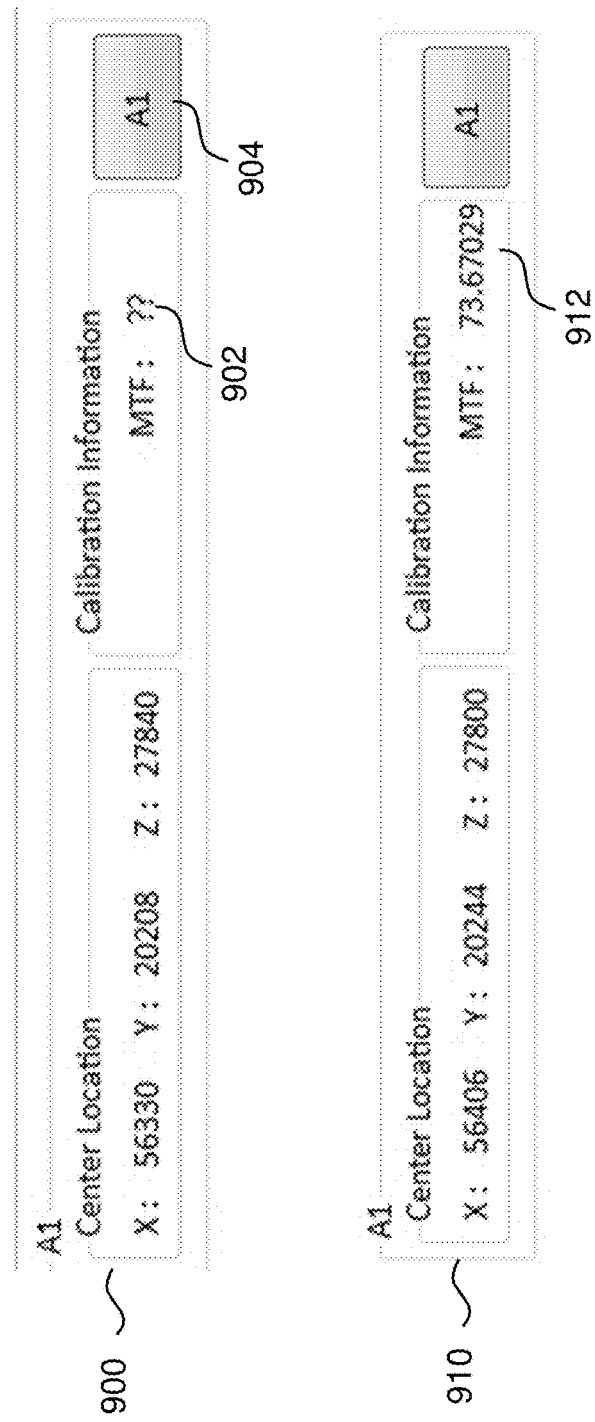
FIGS. 9A & 9B illustrate exemplary components of a graphical user interface (GUI) for measuring flatness in accordance with some embodiments.
Figure 9B:
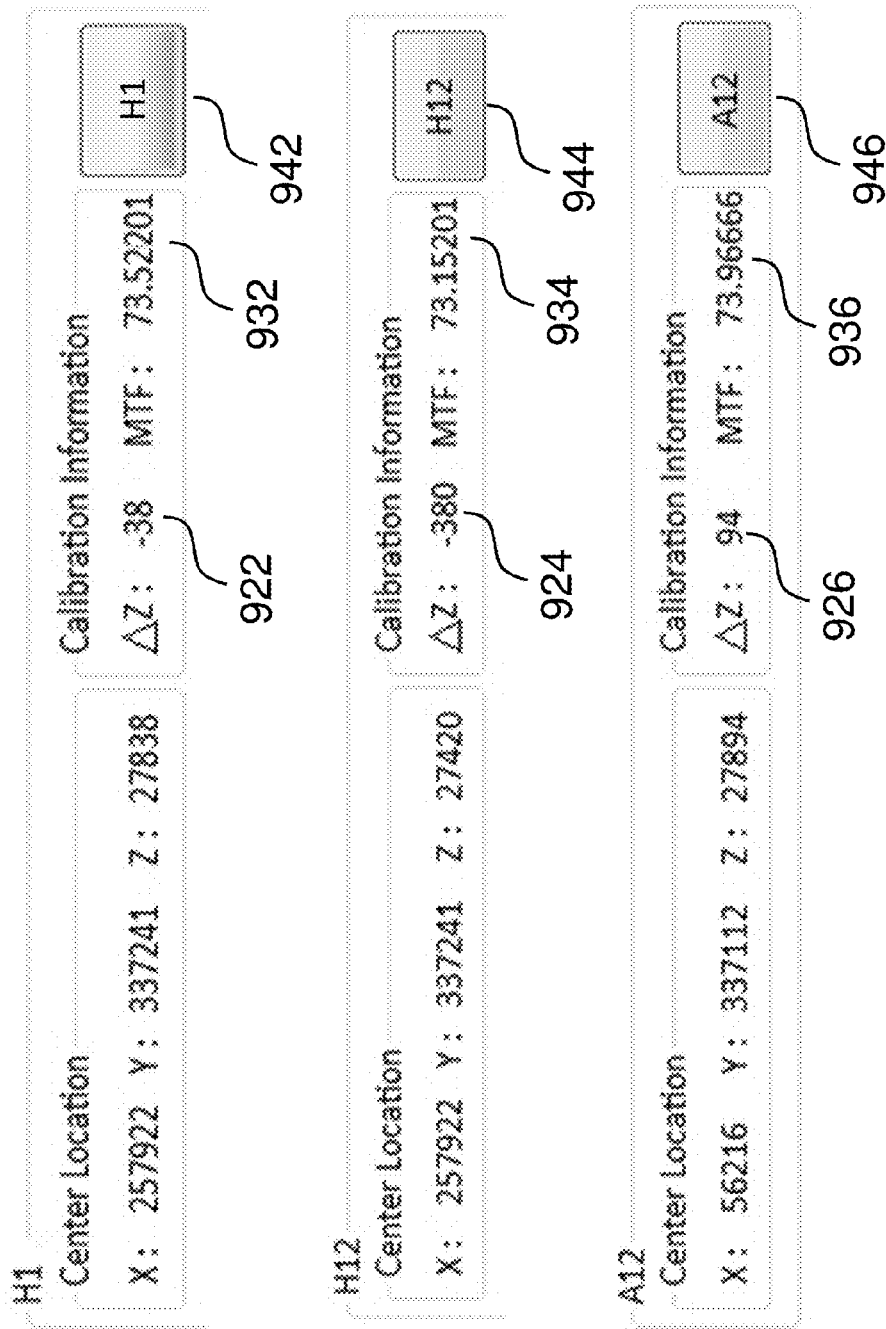

In some embodiments, a sharpest Z coordinate may be displayed to the user, e.g., in a graphical user interface (GUI) of the present disclosure. Exemplary components of a GUI useful in the methods, systems, devices, and/or computer-readable storage media of the present disclosure are illustrated in FIGS. 9A & 9B. At 900, the GUI displays a center location for position A1 of a substrate (e.g., marked glass or a multiwell plate), including X-, Y-, and Z-coordinates. UI object 902 indicates that the best sharpness at XY coordinate A1 has not yet been determined. The user may select affordance 904 (e.g., using a mouse, keyboard, or touchscreen) to determine a sharpest Z coordinate at position A1.

In response, the system measures a sharpest Z coordinate at XY coordinate A1, as described herein. As shown at 900, the GUI then displays a value representing the sharpest coordinate (e.g., the result of a sharpness function of the present disclosure). In this example, this is depicted by a value from an MTF function, which is displayed at UI object 912.

Next, the user may measure a sharpest Z coordinate at XY coordinates H12, H12, and/or A12, as shown in FIG. 9B (see FIG. 3B for an exemplary diagram of the relationship between these points, although the methods and GUIs are not limited to the shape of substrate depicted therein). The user repeats the steps described above for these XY coordinates as described above. For example, the user may select affordance 942 (e.g., using a mouse, keyboard, or touchscreen) to determine a sharpest Z coordinate at position H1, affordance 944 (e.g., using a mouse, keyboard, or touchscreen) to determine a sharpest Z coordinate at position H12, and/or affordance 946 (e.g., using a mouse, keyboard, or touchscreen) to determine a sharpest Z coordinate at position A12. After completing the imaging and determination steps, the GUI displays a value representing the sharpest coordinate (e.g., the result of a sharpness function of the present disclosure). In this example, this is depicted by a value from an MTF function, which is displayed at UI object 932 for H1, UI object 934 for H12, and UI object 936 for A12.

Additionally, the system calculates a difference between the sharpest Z coordinate at A1 and each of H1, H12, and A12 to measure flatness of the detection stage. The calculated values (represented as ΔZ, or the difference between sharpest Z coordinates) are displayed by the GUI at UI objects 922, 924, and 926, respectively. In some embodiments, the values may be expressed as a unit of length (e.g., mm or μm), a number of steps (e.g., motor steps along the Z-axis for a movable objective), or as a percentage (e.g., based on the thickness of the substrate).

Figure 10A:
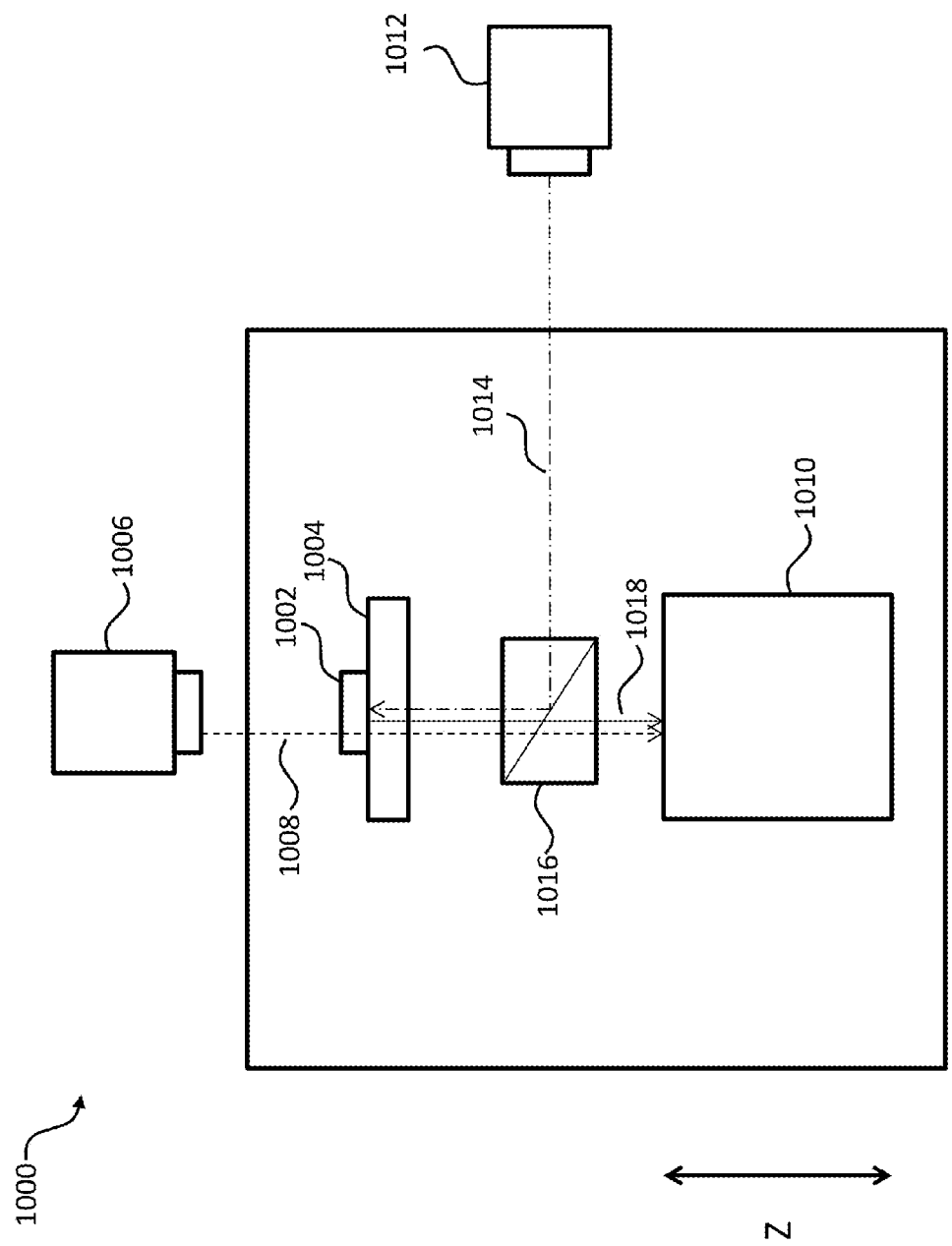
FIGS. 10A & 10B illustrate functional block diagrams for exemplary detection systems/devices in accordance with some embodiments.
Figure 10B:
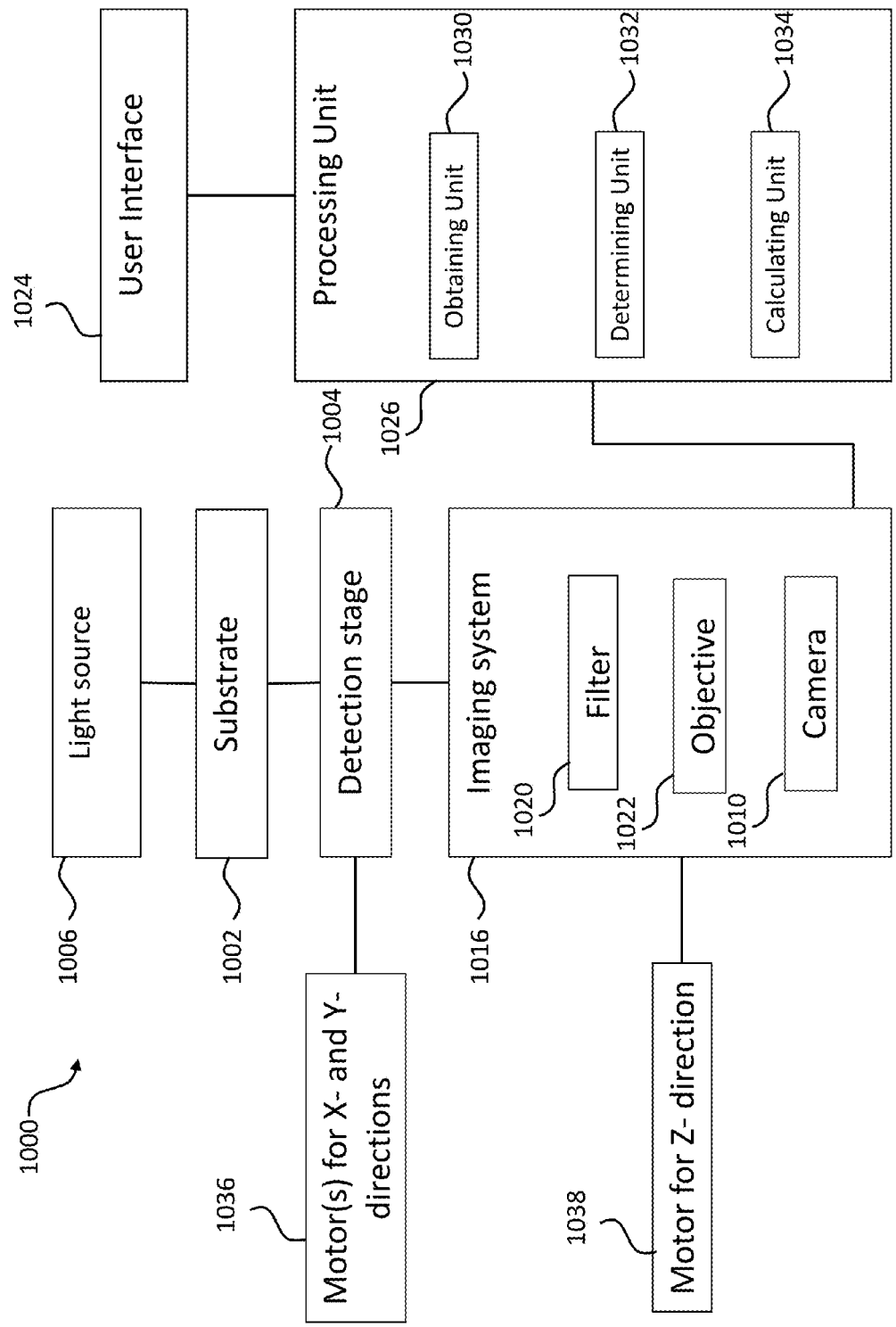

Attention is now directed to the functional block diagram of an exemplary system or device of the present disclosure shown in FIGS. 10A and 10B. FIG. 10A shows a functional block diagram depicting an exemplary configuration of an analyzing system or device in accordance with some embodiments. Assay plate or substrate 1002 (e.g., a glass substrate, optionally with one or more markings as described herein, or a 96-well plate) is positioned on detection stage 1004. In some embodiments, detection stage 1004 is coupled to a stepper motor and/or controller (e.g., motor(s) 1036 in FIG. 10B) to allow assay plate 1002 to be moved along the X- and/or Y-axes. Bright-field light source 1006 (e.g. white light LED) is configured to project light 1008 transmitting through the substrate or assay plate along the Z-axis. The substrate or assay plate is typically transparent or translucent, allowing the light to pass through and to be captured by an imaging unit, e.g., camera 1010 (e.g., a CCD camera). With bright-field light source 1006, camera 1010 is able to obtain two or more bright-field images of Z coordinates useful for flatness measurements. In some embodiments, the resolution of camera 1010's CCD sensor is sufficient to resolve a microcarrier code or pattern.

Fluorescence light source 1012 is configured to project excitation light (e.g., light 1014) to the substrate or assay plate, e.g., to measure sharpness, or to excite one or more fluorescence-based detection agents associated with the microcarriers. The wavelength of light emitted by fluorescence light source 1012 may depend upon the excitation wavelength(s) of the one or more detection agent(s). In some embodiments, multiple fluorescence light sources may be used to excite multiple detection agents with distinct excitation wavelengths. Optical device 1016 (e.g., including one or more filters 1020, reflectors, mirrors, and/or objectives 1022) is configured to guide excitation light 1014 from fluorescence light source 1012 to 1002. In a microcarrier assay, once excited by light 1014, one or more detection agents associated with the microcarriers emit light 1018, which is detected by camera 1010.

Camera 1010 is configured to obtain a bright-field image from light 1008 and/or a fluorescence image from emitted light 1018 for each well of assay plate 1002 or marking of substrate 1002. In some embodiments, multiple fluorescence and/or bright-field images may be obtained from a single well, as exemplified infra. Camera 1010 may include one or more lenses and may be movable along the Z-axis (e.g., 1038 in FIG. 10B) to obtain images at multiple Z coordinates at an XY coordinate.

FIG. 10B shows another functional block diagram depicting an exemplary configuration of an analyzing system or device in accordance with some embodiments. Additional components are depicted. For example, additional, optional components of optical device 1016 are shown, including filter 1020 and objective 1022. In some embodiments, filter 1020 may comprise a filter block. In some embodiments, filter 1020 may comprise one or more filters (e.g., an excitation filter and/or an emission or barrier filter), reflectors, and/or mirrors (e.g., a dichroic mirror or beam-splitter). In some embodiments, objective 1022 may be an objective coupled to camera 1010 for microscopic bright-field and/or fluorescence imaging. In some embodiments, objective 1022 may be positioned above filter 1020. In some embodiments, objective 1022 may contain one or more lenses. In some embodiments, objective 1022 may be coupled to motor 1038 configured to move the objective along the Z-axis. Detection stage 1004 may also be coupled to one or more motor(s) 1036 configured to move stage 1004 along the X- and/or Y-axes.

FIG. 10B also includes user interface 1024 and processor 1026. User interface 1024 may be displayed on a computer monitor or other display to the user and may further comprise a GUI or other user interface to allow for user input (e.g., as illustrated in FIGS. 9A & 9B). Processor 1026 may be used, e.g., in combination with 1022, 1024, 1006, 1010, 1004, and/or 1002, to obtain two or more images (or data representative thereof) of a first and second XY coordinate on substrate 1002 positioned on stage 1004, determine a sharpest Z coordinate at the first and second XY coordinates based on sharpness of the two or more images, and/or calculate a difference between the sharpest Z coordinate at the first XY coordinate and the sharpest Z coordinate at the second XY coordinate to measure the flatness of the detection stage 1004 along the Z-axis. The components shown in FIGS. 10A and 10B are described in greater detail elsewhere herein.

In some embodiments, the methods, systems, and devices of the present disclosure may include one or more light sources. In some embodiments, the methods, systems, and devices of the present disclosure include a light source suitable for bright-field imaging (e.g., bright-field light source 1006). In some embodiments, the two or more images of different Z coordinates obtained at an XY coordinate may be bright field images. In some embodiments, a bright-field image of a well comprising a plurality of microcarriers is obtained using a bright-field light source, lens, and camera. For example, the assay plate containing a well with microcarriers may have substantially transparent top and/or bottom surfaces, such that the bright-field light source can illuminate the well for bright-field imaging. In certain embodiments, the assay plate further comprises a light diffuser film on one or both surfaces to homogenize the bright-field light (e.g., white light-emitting diode or LED). In some embodiments, a bright-field image of one or more microcarriers may be used to decode the digital or analog code. In some embodiments, the bright-field light source provides white light and may include, e.g., a white LED or tungsten-halogen lamp.

In some embodiments, the methods, systems, and devices of the present disclosure include a light source suitable for fluorescence imaging (e.g., fluorescence light source 1012). In some embodiments, the two or more images of different Z coordinates obtained at an XY coordinate may be fluorescence images. In some embodiments, a fluorescence image of a well comprising a plurality of microcarriers is obtained using a fluorescence light source, lens, one or more filters, and camera. In some embodiments, fluorescence imaging is used to detect one or more analytes using one or more detection agents, as described herein. For example, in certain embodiments, bright-field imaging is used to decode the microcarriers, and fluorescence imaging is used to measure the amount of analyte bound to the microcarriers through a fluorescent detection agent. A variety of fluorescence light sources suitable for particular fluorophores are known in the art, including without limitation a mercury light source (e.g., a mercury arc lamp), a xenon light source (e.g., a xenon arc lamp), a metal halide light source (e.g., a metal halide arc lamp), and an LED. The particular fluorescence light source may depend upon which fluorophore is used; e.g., a red diode laser (665 nm), compact Argon Laser (488 nm) or green laser (530 nm) are commonly used for fluorescence light sources for variety of fluorophores (e.g., phycoerythrin (PE), Cy3, Cy5, and so forth).

In some embodiments, the methods, systems, and devices of the present disclosure include one or more filters (e.g., filter 1020). For example, one or more filters may be used to separate excitation light (e.g., light 1014) generated by a fluorescence light source from light emitted from a fluorophore-based detection agent (e.g., light 1018). Typically, such filters may be present in a filter block or cube, which may contain elements such as an excitation filter (which filters light outside of the excitation wavelengths from reaching the detection agent associated with the microcarriers), an emission or barrier filter (which removes light other than that emitted from the detection agent associated with the microcarriers from reaching the camera), and a dichroic mirror or beam-splitter (which isolates the emission light traveling to the objective/camera from the excitation and other light sources).

In some embodiments, the methods, systems, and devices of the present disclosure include a camera (e.g., camera 1010). In some embodiments, the camera is able to obtain images representing different Z coordinates. For example, in certain embodiments of a microcarrier assay, the camera obtains a bright-field image (which may be used for microcarrier decoding and/or couting) and a fluorescence image (which may be used for analyte quantification through a fluorescent detection agent). In certain embodiments, the camera obtains a bright-field image (which may be used for microcarrier decoding and/or couting) and a luminescence image (which may be used for analyte quantification through a luminescent detection agent). Examples of suitable cameras include without limitation a charge-coupled device (CCD) camera.

In some embodiments, the methods, systems, and devices of the present disclosure include one or more processors (e.g., processor 1026). Processor 1026 and/or user interface 1024 may be part of or coupled to a computer system, such as a laptop, desktop, or tablet computer. Other computer components may include, without limitation, a display or monitor, input devices such as a keyboard, mouse, track-pad, touch-sensitive surface (e.g., a touch-sensitive display), volatile memory (e.g., random access memory or RAM), non-volatile memory (e.g., read only memory or ROM, flash memory, optical drive, magnetic storage devices such as a hard drive, etc.), an operating system, basic input/output system (BIOS), a system bus that couples system components including the memory to the one or more processors. For example, a system bus may be any of several types of bus structures including a memory bus or memory controller, a peripheral bus, and a local bus using any of a variety of bus architectures, including without limitation Industry Standard Architecture (USA) bus, Micro Channel Architecture (MCA) bus, Enhanced ISA (EISA) bus, Video Electronics Standards Association (VESA) local bus, and Peripheral Component Interconnect (PCI) bus.

The system memory may include non-transitory computer-readable storage media in the form of volatile and/or nonvolatile memory, e.g., such as ROM and/or RAM. A BIOS may containing basic routines that help to transfer information between elements within the computer system, such as during start-up, and is typically stored in ROM. RAM typically contains data and/or program modules that are immediately accessible to and/or presently being operated on by the one or more processors. The system memory may further include an operating system and/or one or more programs or applications accessible to the user through the operating system. Such programs or applications may be used, e.g., to execute one or more steps of the methods described herein.

A computer system may also include other removable/non-removable, volatile/nonvolatile non-transitory computer-readable storage media. These computer-readable storage media may include, without limitation, a hard disk that reads from or writes to non-removable, nonvolatile magnetic media, a magnetic disk drive that reads from or writes to a removable, nonvolatile magnetic disk, an optical disk drive that reads from or writes to a removable, nonvolatile optical disk such as a CD-ROM or other optical media, flash memory devices or drives, digital versatile disks, digital video tape, solid state RAM, solid state ROM, and the like. A hard disk drive is typically connected to the system bus through a non-removable memory interface, and a magnetic disk drive and/or optical disk drive are typically connected to the system bus by a removable memory interface. These and other devices are often connected to the one or more processors through an input interface that is coupled to the system bus, but may be connected by other interface and bus structures, such as a parallel port, game port or a universal serial bus (USB). In particular, a USB may be used to read from or write to a removable memory device, such as a flash drive. In addition, a computer system may operate in a network environment, such as a local area network (LAN), connected wirelessly or via Ethernet cable to a router or switch.

It will be appreciated by one of skill in the art that one or more of the components depicted in FIGS. 10A and 10B may be used to perform one or more of the steps depicted in the flow diagrams shown in FIGS. 1 and 8. For example, processor 1026 may be used to implement one or more of the processes shown in blocks 102, 104, 106, 108, 110, 806, and/or 808. Light source 1006, optical device 1016 (optionally including filter 1020 and/or objective 1022), and camera 1010 or 1024 (optionally in combination with processor 1026) may be used to implement one or more of the processes shown in blocks 102, 106, and/or 806. These and other potential implementations will be readily evident to the skilled artisan.

In some embodiments, a non-transitory computer-readable storage medium of the present disclosure contains one or more programs for execution by one or more processors of a device of the present disclosure. In some embodiments, the device may include one or more processors of the present disclosure. In some embodiments, the device may include one or more processors, an objective, a camera, a light source, and/or a detection stage of the present disclosure. In some embodiments, the one or more programs include instructions which, when executed by one or more processors, cause a device of the present disclosure to perform any of the methods described herein. For example, in some embodiments, the instructions, when executed by the one or more processors, cause the device to: obtain first data representing two or more images of a first XY coordinate on a substantially flat substrate positioned on the detection stage, wherein the two or more images represent different Z coordinates at the first XY coordinate; based on the first data, determine a sharpest Z coordinate at the first XY coordinate based on sharpness of the two or more images representing different Z coordinates at the first XY coordinate; obtain second data representing two or more images of a second XY coordinate spaced apart from the first XY coordinate on the substantially flat substrate, wherein the two or more images of the second XY coordinate represent different Z coordinates at the second XY coordinate; based on the second data, determine a sharpest Z coordinate at the second XY coordinate based on sharpness of the two or more images representing different Z coordinates at the second XY coordinate; and calculate a difference between the sharpest Z coordinate at the first XY coordinate and the sharpest Z coordinate at the second XY coordinate to measure the flatness of the detection stage along the Z-axis. In some embodiments, the first and/or second data are obtained by a camera using an objective and a light source.

In some embodiments, a device of the present disclosure (e.g., an electronic imaging device) comprises a processing unit (e.g., one or more processors of the present disclosure). Exemplary processing unit 1026 is illustrated in FIG. 10B. In some embodiments, processing unit 1026 is coupled to a camera (e.g., camera 1010), a light source (e.g., bright-field light source 1006 and/or fluorescence light source 1012), an objective (e.g., objective 1022), and/or a detection stage (e.g., detection stage 1004). In some embodiments, processing unit 1026 is configured to: obtain (e.g., using obtaining unit 1030 with camera 1010, objective 1022, filter 1020, light source 1006, and/or detection stage 1004) first data representing two or more images of a first XY coordinate on a substantially flat substrate (e.g., substrate 1002) positioned on a detection stage (e.g., detection stage 1004), wherein the two or more images represent different Z coordinates at the first XY coordinate; based on the first data, determine (e.g., with determining unit 1032) a sharpest Z coordinate at the first XY coordinate based on sharpness of the two or more images representing different Z coordinates at the first XY coordinate; obtain (e.g., using obtaining unit 1030 with camera 1010, objective 1022, filter 1020, light source 1006, and/or detection stage 1004) second data representing two or more images of a second XY coordinate spaced apart from the first XY coordinate on the substantially flat substrate (e.g., substrate 1002), wherein the two or more images of the second XY coordinate represent different Z coordinates at the second XY coordinate; based on the second data, determine (e.g., with determining unit 1032) a sharpest Z coordinate at the second XY coordinate based on sharpness of the two or more images representing different Z coordinates at the second XY coordinate; and calculate (e.g., with calculating unit 1034) a difference between the sharpest Z coordinate at the first XY coordinate and the sharpest Z coordinate at the second XY coordinate to measure the flatness of the detection stage (e.g., detection stage 1004) along the Z-axis. In some embodiments, the data representing one or more images are obtained (e.g., using obtaining unit 1030) by objective 1022, light source 1006 or 1012, and camera 1010. In some embodiments, processing unit 1026 is coupled to a display (e.g., a laptop, tablet, smartphone, touchscreen, or computer monitor). In some embodiments, the display may be configured to display user interface 1024 (e.g., a GUI of the present disclosure). In some embodiments, user interface 1024 may be used to display values to a user, or receive a user input (e.g., as illustrated in FIGS. 9A & 9B).

It will be understood that a processing unit of the present disclosure may be configured to perform any of the methods of the present disclosure (e.g., using non-transitory computer-readable storage medium of the present disclosure) and/or may be configured for use in one or more devices of the present disclosure. Further, it will be understood that although processing unit 1026 is shown in FIG. 10B as being coupled to a camera, light source, detection stage, and optical device, these is merely an optional configuration. In some embodiments, processing unit 1026 and/or user interface 1024 may be part of a stand-alone computer, laptop, tablet, smart phone, or the like that is configured to receive data from an optical device with a camera, light source, and detection stage, e.g., from a volatile or non-volatile non-transitory computer-readable storage medium, an optical disk drive, a removable memory device such as a flash memory device or drive, a magnetic disk drive, a network connection such as a wireless LAN or router, and so forth.

VI. Multiplex Assays

Certain aspects of the present disclosure relate to methods, systems, devices, and computer-readable storage media for measuring flatness of a detection stage. The stage may be used, e.g., to position an assay plate comprising a plurality of encoded microcarriers during a multiplex assay. Such assays may involve, e.g., detecting analytes in a solution by using an encoded microcarrier, such as those described herein. In some embodiments, the solution comprising one or more encoded microcarriers (or microcarrier species) and one or more analytes is contained within a well of an assay plate of the present disclosure. Advantageously, the methods, systems, devices, and/or computer-readable storage media may be used to calibrate a detection stage for a multiplex assay by measuring and/or improving flatness, which can improve the accuracy of analyte detection and the speed of multiplex assays (e.g., by reducing the amount of time needed to focus the objective along the Z-axis).

Exemplary multiplex assays of the present disclosure may comprise contacting a solution comprising a first analyte and a second analyte with a plurality of microcarriers, where the plurality of microcarriers comprises at least a first microcarrier of the present disclosure that specifically captures the first analyte and is encoded with a first code, and a second microcarrier of the present disclosure that specifically captures the second analyte and is encoded with a second code; decoding the first code and the second code using analog shape recognition to identify the first microcarrier and the second microcarrier; and detecting an amount of the first analyte bound to the first microcarrier and an amount of the second analyte bound to the second microcarrier. As described supra, a code of the present disclosure may be a digital code, such as a barcode, or the code may be an analog code, such as a two-dimensional shape.

In some embodiments, the multiplex assays of the present disclosure include contacting a solution comprising a first analyte and a second analyte with a plurality of microcarriers. In some embodiments, the plurality of microcarriers may include a first subset of one or more microcarriers of the present disclosure that specifically recognize the first analyte (e.g., using a capture agent, coupled to each microcarrier, that is specific for the first analyte), where each microcarrier of the first subset of the one or more microcarriers is encoded with a first code; and a second subset of one or more microcarriers of the present disclosure that specifically recognize the second analyte (e.g., using a capture agent, coupled to each microcarrier, that is specific for the second analyte), where each microcarrier of the second subset of the one or more microcarriers is encoded with a second code different from the first code.

In some embodiments, the first and second analytes may be different. That is to say, the second capture agent may specifically recognize a second analyte that is different from the first analyte. In other embodiments, the first and second analytes may be the same, e.g., the first and second microcarriers may both specifically recognize the same analyte (this may be useful, e.g., for quality control purposes), or they may recognize distinct regions of the same analyte (e.g., antibodies recognizing different epitopes of the same antigen).

The methods of the present disclosure may be used to detect analytes in any suitable solution. In some embodiments, the solution comprises a biological sample. Examples of biological samples include without limitation blood, urine, sputum, bile, cerebrospinal fluid, interstitial fluid of skin or adipose tissue, saliva, tears, bronchial-alveolar lavage, oropharyngeal secretions, intestinal fluids, cervico-vaginal or uterine secretions, and seminal fluid. In some embodiments, the biological sample may be from a human. In other embodiments, the solution comprises a sample that is not a biological sample, such as an environmental sample, a sample prepared in a laboratory (e.g., a sample containing one or more analytes that have been prepared, isolated, purified, and/or synthesized), a fixed sample (e.g., a formalin-fixed, paraffin-embedded or FFPE sample), and so forth.

In some embodiments, the analysis is multiplexed, that is, each solution (e.g., a sample) is analyzed so that a signal from the signal emitting entity is detected by the reaction detection system for at least 2 analytes of interest, at least 3 analytes of interest, at least 4 analytes of interest, at least 5 analytes of interest, at least 10 analytes of interest, at least 15 analytes of interest, at least 20 analytes of interest, at least 25 analytes of interest, at least 30 analytes of interest, at least 35 analytes of interest, at least 40 analytes of interest, at least 45 analytes of interest, or at least 50 analytes of interest, or more.

In some aspects, a microcarrier of the present disclosure can comprise a capture agent. In some embodiments, the capture agent for a particular microcarrier species may be a "unique capture agent," e.g., a capture agent is associated with a particular microcarrier species having a particular identifier (e.g., analog code). The capture agent can be any biomolecule or a chemical compound capable of binding one or more analytes (such as a biomolecule or chemical compound) present in the solution. Examples of biomolecule capture agents include, but are not limited to, a DNA molecule, a DNA-analog-molecule, an RNA-molecule, an RNA-analog-molecule, a polynucleotide, a protein, an enzyme, a lipid, a phospholipid, a carbohydrate moiety, a polysaccharide, an antigen, a virus, a cell, an antibody, a small molecule, a bacterial cell, a cellular organelle, and an antibody fragment. Examples of chemical compound capture agents include, but are not limited to, individual components of chemical libraries, small molecules, or environmental toxins (for example, pesticides or heavy metals).

In some embodiments, the capture agent is coupled to a surface of the microcarrier (in some embodiments, in at least a center portion of the microcarrier surface). In some embodiments, the capture agent can be chemically attached to the microcarrier. In other embodiments, the capture agent can be physically absorbed to the surface of the microcarrier. In some embodiments, the attachment linkage between the capture agent and the microcarrier surface can be a covalent bond. In other embodiments, the attachment linkage between the capture agent and the microcarrier surface can be a non-covalent bond including, but not limited to, a salt bridge or other ionic bond, one or more hydrogen bonds, hydrophobic interactions, Van der Waals force, London dispersion force, a mechanical bond, one or more halogen bonds, aurophilicity, intercalation, or stacking.

In some aspects, more than one (such as two, three, four, five, six, seven, eight, nine, or ten) capture agents for the same analyte can each be associated with a microcarrier described herein. In this embodiment, each capture agent for a particular analyte binds to the analyte with a different affinity as measured by the dissociation constant of analyte/capture agent binding. Accordingly, within a plurality of microcarriers in a composition, there can be two or more subpopulations of microcarriers with capture agents that bind to the same analyte, but wherein the capture agents associated with each subpopulation bind to the analyte with a different affinity. In some embodiments, the dissociation constant of the analyte for any of the capture agents is not greater than $10^{-6}$ M, such as $10^{-7}$M or $10^{-8}$M. In other embodiments, the dissociation constant of the analyte for any of the capture agents is from about $10^{-10}$ M to about $10^{-6}$ M, such from about $10^{-10}$ M to about $10^{-7}$ M, about $10^{-10}$ M to about $10^{-8}$ M, about $10^{-10}$ M to about $10^{-9}$ M, about $10^{-9}$ M to about $10^{-6}$ M, about $10^{-9}$ M to about $10^{-7}$ M, about $10^{-9}$ M to about $10^{-8}$ M, about $10^{-8}$ M to about $10^{-6}$ M, or about $10^{-8}$ M to about $10^{-7}$ M. In some embodiments, the dissociation constant of the analyte for any two capture agents differs by as much as about 3 $\log_{10}$, such as by as much as about 2.5 $\log_{10}$, 2 $\log_{10}$, 1.5 $\log_{10}$, or 1 $\log_{10}$.

In some embodiments, an analyte of the present disclosure is coupled to a microcarrier for the capture of one or more analytes. In some embodiments, the one or more analytes may be captured from a sample, such as a biological sample described herein. In some embodiments, an analyte may include without limitation a DNA molecule, a DNA-analog-molecule, an RNA-molecule, an RNA-analog-molecule, a polynucleotide, a protein, an enzyme, a lipid, a phospholipid, a carbohydrate moiety, a polysaccharide, an antigen, a virus, a cell, an antibody, a small molecule, a bacterial cell, a cellular organelle, and an antibody fragment. In other embodiments, the analyte is a chemical compound (such as a small molecule chemical compound) capable of binding to the capture agent such as individual components of chemical libraries, small molecules, or environmental toxins (for example, pesticides or heavy metals).

In some aspects, the analytes in a sample (such as a biological sample) can be labeled with a signal-emitting entity capable of emitting a detectable signal upon binding to the capture agent. In some embodiments, the signal-emitting entity can be colorimetric based. In other embodiments, the signal-emitting entity can be fluorescence-based including, but not limited to, phycoerythrin, blue fluorescent protein, green fluorescent protein, yellow fluorescent protein, cyan fluorescent protein, and derivatives thereof. In other embodiments, the signal-emitting entity can be radio-isotope based, including, but not limited to, molecules labeled with $^{32}$P, $^{33}$P, $^{22}$Na, $^{36}$Cl, $^{2}$H, $^{3}$H, $^{35}$S, and $^{123}$I. In other embodiments, the signal-emitting entity is light-based including, but not limited to, luciferase (e.g., chemiluminescence-based), horseradish peroxidase, alkaline phosphatase, and derivatives thereof. In some embodiments, the biomolecules or chemical compounds present in the sample can be labeled with the signal-emitting entity prior to contact with the microcarrier. In other embodiments, the biomolecules or chemical compounds present in the sample can be labeled with the signal-emitting entity subsequent to contact with the microcarrier.

In some embodiments, the methods include detecting an amount of the first analyte bound to the first microcarrier and an amount of the second analyte bound to the second microcarrier. Any suitable analyte detection technique(s) known in the art may be used. For example, in some embodiments, the first and the second microcarriers may be incubated with one or more detection agents. In some embodiments, the one or more detection agents bind the first analyte captured by the first microcarrier and the second analyte captured by the second microcarrier. In some embodiments, the methods further include measuring the amount of detection agent bound to the first and the second microcarriers.

In some embodiments, the analytes in a solution (such as a biological sample) can be labeled with a detection agent (e.g., a signal-emitting entity) capable of emitting a detectable signal upon binding to the capture agent. In some embodiments, the detection agent can be colorimetric based. In other embodiments, the detection agent can be fluorescence-based including, but not limited to, phycoerythrin, blue fluorescent protein, green fluorescent protein, yellow fluorescent protein, cyan fluorescent protein, and derivatives thereof. In other embodiments, the detection agent can be radioisotope based, including, but not limited to, molecules labeled with $^{32}P$, $^{33}P$, $^{22}Na$, $^{36}Cl$, $^{2}H$, $^{3}H$, $^{35}S$, and $^{123}I$. In other embodiments, the detection agent is luminescence- or light-based, including, but not limited to, luciferase (e.g. chemiluminescence-based), horseradish peroxidase, alkaline phosphatase and derivatives thereof. In some embodiments, the biomolecules or chemical compounds present in the solution can be labeled with the detection agent prior to contact with the microcarrier composition. In other embodiments, the biomolecules or chemical compounds present in the solution can be labeled with the detection agent subsequent to contact with the microcarrier composition. In yet other embodiments, the detection agent may be coupled to a molecule or macromolecular structure that specifically binds the analyte of interest, e.g., a DNA molecule, a DNA-analog-molecule, an RNA-molecule, an RNA-analog-molecule, a polynucleotide, a protein, an enzyme, a lipid, a phospholipid, a carbohydrate moiety, a polysaccharide, an antigen, a virus, a cell, an antibody, a small molecule, a bacterial cell, a cellular organelle, and/or an antibody fragment.

In some embodiments, the detection agent is a fluorescent detection agent, and the amount of detection agent bound to the first and the second microcarriers is measured by fluorescence microscopy (e.g., a fluorescent microscope or plate reader). In other embodiments, the detection agent is a luminescent detection agent, and the amount of detection agent bound to the first and the second microcarriers is measured by luminescence microscopy (e.g., a luminescent microscope or plate reader).

In some embodiments, each analyte/capture agent may be used with a specific detection agent. As non-limiting examples, the detection agent may be a detection agent (e.g., a fluorescent, luminescent, enzymatic, or other detection agent) coupled to an antibody that specifically binds the analyte; or a ligand or receptor of a ligand-receptor pair, if the analyte is a cognate ligand/receptor of the ligand-receptor pair. This technique is conceptually similar to a sandwich ELISA or protein microarray that includes a capture and a detection antibody (though it should be noted in the present case that the agents in this example are not strictly limited to antibodies). As another non-limiting example, the detection agent may be a fluorescent or other detectable probe coupled to a protein of interest, such as a labeled analyte of interest. For example, a reaction may be used to couple detection agent(s) to one or more proteins in a solution of interest (e.g., a sample), which would then be captured by the capture agents (conceptually similar to an antigen capture-type of protein microarray).

In other embodiments, multiple unique analytes/capture agents may be used with a universal detection agent. As non-limiting examples, the detection agent may be an agent that binds to the Fc region of an antibody, if the analyte is an antibody; a fluorescent or other detectable probe coupled to an oligonucleotide (e.g., a single stranded oligonucleotide that hybridizes with an analyte), if the analyte is a polynucleotide such as DNA or RNA. The later scenario is conceptually similar to a microarray technique.

In some embodiments, the multiplex assays of the present disclosure may include one or more washing steps, e.g., to reduce contaminants, remove any substances non-specifically bound to the capture agent and/or microcarrier surface, and so forth. In some embodiments, a magnetic separation step may be used to wash a microcarrier containing a magnetic layer or material of the present disclosure. In other embodiments, other separation steps known in the art may be used. In some embodiments, the washing and/or separation steps may occur before analyte detection.

Although the foregoing invention has been described in some detail by way of illustration and example for purposes of clarity of understanding, the descriptions and examples should not be construed as limiting the scope of the invention. The disclosures of all patent and scientific literature cited herein are expressly incorporated in their entirety by reference.

What is claimed is:

1. A method for measuring flatness along a Z-axis of a detection stage, the method comprising:
   (a) at an electronic device comprising an objective, a light source, a camera, and the detection stage, positioning a substantially flat substrate on the detection stage perpendicular to the objective, the camera, and the light source;
   (b) obtaining two or more images of a first XY coordinate on a substantially flat substrate positioned on the detection stage, wherein the two or more images represent different Z coordinates at the first XY coordinate;
   (c) determining a sharpest Z coordinate at the first XY coordinate based on sharpness of the two or more images representing different Z coordinates at the first XY coordinate;
   (d) obtaining two or more images of a second XY coordinate spaced apart from the first XY coordinate on the substantially flat substrate, wherein the two or more images of the second XY coordinate represent different Z coordinates at the second XY coordinate;
   (e) determining a sharpest Z coordinate at the second XY coordinate based on sharpness of the two or more images representing different Z coordinates at the second XY coordinate;
   (f) calculating a difference between the sharpest Z coordinate at the first XY coordinate and the sharpest Z coordinate at the second XY coordinate to measure the flatness of the detection stage along the Z-axis;
   (g) positioning an assay plate on the detection stage perpendicular to the objective, the camera, and the light source, wherein the assay plate comprises:
   a plurality of encoded microcarriers, and
   a solution comprising at least a first analyte, wherein at least a first encoded microcarrier of the plurality comprises a capture agent specific for the first analyte;

(h) obtaining a first image of the assay plate, wherein first image comprises an image of the code of the first encoded microcarrier; and (i) obtaining a second image of the assay plate, wherein the second image detects an amount of the first analyte bound to the first encoded microcarrier by the capture agent.

2. The method of claim 1, wherein the detection stage is a movable detection stage, and wherein the method further comprises:
obtaining the two or more images of the second XY coordinate, moving the detection stage to re-position the substantially flat substrate such that the second XY coordinate is aligned with the objective, the light source, and the camera.

3. The method of claim 2, wherein the detection stage is coupled to a motor configured to move the detection stage along an X-axis.

4. The method of claim 2, wherein the detection stage is coupled to a motor configured to move the detection stage along a Y-axis.

5. The method of claim 1, wherein the objective is a movable objective, wherein obtaining the two or more images representing different Z coordinates at the first XY coordinate comprises re-positioning the objective along the Z-axis, and wherein obtaining the two or more images representing different Z coordinates at the second XY coordinate comprises re-positioning the objective along the Z-axis.

6. The method of claim 5, wherein the objective is coupled to a motor configured to move the objective along the Z-axis.

7. The method of claim 1, further comprising:
after (f) and before (g), adjusting the detection stage along the Z-axis to reduce the calculated difference between the sharpest Z coordinate at the first XY coordinate and the sharpest Z coordinate at the second XY coordinate.

8. The method of claim 1, wherein the sharpest Z coordinate at the first XY coordinate and the sharpest Z coordinate at the second XY coordinate are both determined using one or more sharpness functions selected from the group consisting of Vollath's F4, Vollath's F5, sharpness variance, sharpness gradient, sharpness entropy, Bayes spectral entropy (BSE), mid frequency discrete cosine transform (DCT), robust discrete cosine transform (RDCT), sum of differences across rows (SMD1), sum of differences across rows and columns (SMD2), sum of modified Laplacians (SML), squared gradient, and modulation transfer function (MTF).

9. The method of claim 1, wherein the substantially flat substrate has a first end and a second end along the Z-axis, and wherein the positions of the first end and the second end differ along the Z-axis by less than about 200 μm.

10. The method of claim 1, wherein the substantially flat substrate comprises a glass plate comprising a visible pattern on at least the first and the second XY coordinates.

11. The method of claim 1, wherein the substantially flat substrate comprises a multiwell plate.

12. The method of claim 11, wherein the first XY coordinate is located at a first well of the multiwell plate, wherein the second XY coordinate is located at a second well of the multiwell plate, and wherein the first and the second wells of the multiwell plate each comprise one or more objects for imaging.

13. The method of claim 12, wherein the one or more objects for imaging are the plurality of encoded microcarriers, and wherein the multiwell plate is the assay plate.

14. The method of claim 1, wherein the substantially flat substrate is substantially rectangular.

15. The method of claim 14, wherein the first XY coordinate is positioned at a first corner of the substantially flat substrate, and wherein the second XY coordinate is positioned at a second corner of the substantially flat substrate.

16. The method of claim 1, further comprising repeating steps (a)-(f) for a third XY coordinate and a fourth XY coordinate, wherein the third and the fourth XY coordinates are different from the first and the second XY coordinates, and wherein the third XY coordinate and the fourth XY coordinate replace the first and the second XY coordinates, respectively, during the repeated steps (a)-(f).

17. The method of claim 16, wherein the substantially flat substrate is substantially rectangular, wherein the first XY coordinate is positioned at a first corner of the substantially flat substrate, wherein the second XY coordinate is positioned at a second corner of the substantially flat substrate, wherein the third XY coordinate is positioned at a third corner of the substantially flat substrate, and wherein the fourth XY coordinate is positioned at a fourth corner of the substantially flat substrate.

18. The method of claim 1, wherein the detection stage is configured to receive a multiwell plate.

19. The method of claim 1, wherein the solution further comprises a second analyte, wherein the plurality of encoded microcarriers further comprises a second encoded microcarrier comprising a second capture agent specific for the second analyte, and wherein the method further comprises, after step (i):

(j) obtaining a third image of the assay plate, wherein third image comprises an image of the code of the second encoded microcarrier; and (k) obtaining a fourth image of the assay plate, wherein the fourth image detects an amount of the second analyte bound to the second encoded microcarrier by the second capture agent.

20. The method of claim 19, wherein the first and the second analytes are different.

21. The method of claim 19, wherein the first encoded microcarrier is in a first well of the assay plate, wherein the second encoded microcarrier is in a second well of the assay plate, wherein the first and the second wells are different, and wherein the first and the second wells each comprise a portion of the solution.

22. The method of claim 19, wherein the code of the first encoded microcarrier comprises a first analog code, wherein the code of the second encoded microcarrier comprises a second analog code, and wherein the first and the second analog codes are different.

23. The method of claim 1, wherein the code of the first encoded microcarrier comprises a first analog code.

24. A system comprising:
an objective, a camera, a light source, a detection stage, one or more processors, a memory, and one or more programs stored in the memory, wherein the one or more programs are configured to be executed by the one or more processors, and wherein the one or more programs include instructions for:

(a) obtaining first data representing two or more images of a first XY coordinate on a substantially flat substrate positioned on the detection stage, wherein the two or more images represent different Z coordinates at the first XY coordinate;

(b) based on the first data, determining a sharpest Z coordinate at the first XY coordinate based on sharpness of the two or more images representing different Z coordinates at the first XY coordinate;

(c) obtaining second data representing two or more images of a second XY coordinate spaced apart from the first XY coordinate on the substantially flat substrate, wherein the two or more images of the second XY coordinate represent different Z coordinates at the second XY coordinate;

(d) based on the second data, determining a sharpest Z coordinate at the second XY coordinate based on sharpness of the two or more images representing different Z coordinates at the second XY coordinate;

(e) calculating a difference between the sharpest Z coordinate at the first XY coordinate and the sharpest Z coordinate at the second XY coordinate to measure the flatness of the detection stage along the Z-axis;

(f) obtaining third data representing a first image of an assay plate, wherein the assay plate is positioned on the detection stage, wherein the assay plate comprises a plurality of encoded microcarriers and a solution comprising at least a first analyte, wherein at least a first encoded microcarrier of the plurality comprises a capture agent specific for the first analyte, and wherein first image comprises an image of the code of the first encoded microcarrier; and (g) obtaining fourth data representing a second image of the assay plate, wherein the second image detects an amount of the first analyte bound to the first encoded microcarrier by the capture agent.

25. The system of claim 24, wherein the detection stage is a movable detection stage, and wherein the one or more programs further include instructions for:
before obtaining the second data, moving the detection stage to re-position the substantially flat substrate such that the second XY coordinate is aligned with the objective, the light source, and the camera.

26. The system of claim 25, wherein the detection stage is coupled to a motor configured to move the detection stage along an X-axis.

27. The system of claim 25, wherein the detection stage is coupled to a motor configured to move the detection stage along a Y-axis.

28. The system of claim 24, wherein the objective is a movable objective, wherein obtaining the first data comprises re-positioning the objective along the Z-axis at the first XY coordinate, and wherein obtaining the second data comprises re-positioning the objective along the Z-axis at the second XY coordinate.

29. The system of claim 28, wherein the objective is coupled to a motor configured to move the objective along the Z-axis.

30. The system of claim 24, wherein the one or more programs further include instructions for:
adjusting the detection stage along the Z-axis to reduce the calculated difference between the sharpest Z coordinate at the first XY coordinate and the sharpest Z coordinate at the second XY coordinate.

31. The system of claim 24, wherein the sharpest Z coordinate at the first XY coordinate and the sharpest Z coordinate at the second XY coordinate are both determined using one or more sharpness functions selected from the group consisting of Vollath's F4, Vollath's F5, sharpness variance, sharpness gradient, sharpness entropy, Bayes spectral entropy (BSE), mid frequency discrete cosine transform (DCT), robust discrete cosine transform (RDCT), sum of differences across rows (SMD1), sum of differences across rows and columns (SMD2), sum of modified Laplacians (SML), squared gradient, and modulation transfer function (MTF).

32. The system of claim 24, wherein the substantially flat substrate has a first end and a second end along the Z-axis, and wherein the positions of the first end and the second end differ along the Z-axis by less than about 200 μm.

33. The system of claim 24, wherein the substantially flat substrate comprises a glass plate comprising a visible pattern on at least the first and the second XY coordinates.

34. The system of claim 24, wherein the substantially flat substrate comprises a multiwell plate.

35. The system of claim 34, wherein the first XY coordinate is located at a first well of the multiwell plate, wherein the second XY coordinate is located at a second well of the multiwell plate, and wherein the first and the second wells of the multiwell plate each comprise one or more objects for imaging.

36. The system of claim 35, wherein the one or more objects for imaging comprise one or more encoded microcarriers.

37. The system of claim 24, wherein the substantially flat substrate is substantially rectangular.

38. The system of claim 37, wherein the first XY coordinate is positioned at a first corner of the substantially flat substrate, and wherein the second XY coordinate is positioned at a second corner of the substantially flat substrate.

39. The system of claim 24, wherein the one or more programs further include instructions for:
repeating steps (a)-(e) for a third XY coordinate and a fourth XY coordinate, wherein the third and the fourth XY coordinates are different from the first and the second XY coordinates, and wherein the third XY coordinate and the fourth XY coordinate replace the first and the second XY coordinates, respectively, during the repeated steps (a)-(e).

40. The system of claim 39, wherein the substantially flat substrate is substantially rectangular, wherein the first XY coordinate is positioned at a first corner of the substantially flat substrate, wherein the second XY coordinate is positioned at a second corner of the substantially flat substrate, wherein the third XY coordinate is positioned at a third corner of the substantially flat substrate, and wherein the fourth XY coordinate is positioned at a fourth corner of the substantially flat substrate.

41. The system of claim 24, wherein the detection stage is configured to receive a multiwell plate.

42. The system of claim 24, wherein the solution further comprises a second analyte, wherein the plurality of encoded microcarriers further comprises a second encoded microcarrier comprising a second capture agent specific for the second analyte, and wherein the one or more programs further include instructions for, after step (g):
(h) obtaining fifth data representing a third image of the assay plate, wherein third image comprises an image of the code of the second encoded microcarrier; and
(i) obtaining sixth data representing a fourth image of the assay plate, wherein the fourth image detects an amount of the second analyte bound to the second encoded microcarrier by the second capture agent.

43. The system of claim 42, wherein the first and the second analytes are different.

44. The system of claim 42, wherein the first encoded microcarrier is in a first well of the assay plate, wherein the second encoded microcarrier is in a second well of the assay plate, wherein the first and the second wells are different, and wherein the first and the second wells each comprise a portion of the solution.

45. The system of claim 24, wherein the code of the first encoded microcarrier comprises a first analog code.

46. The system of claim 42, wherein the code of the first encoded microcarrier comprises a first analog code, wherein the code of the second encoded microcarrier comprises a second analog code, and wherein the first and the second analog codes are different.

47. A non-transitory computer-readable storage medium comprising one or more programs for execution by one or more processors of an electronic device with an objective, a camera, a light source, and a detection stage, the one or more programs including instructions which, when executed by the one or more processors, cause the device to:
obtain first data representing two or more images of a first XY coordinate on a substantially flat substrate positioned on the detection stage, wherein the two or more images represent different Z coordinates at the first XY coordinate;
based on the first data, determine a sharpest Z coordinate at the first XY coordinate based on sharpness of the two or more images representing different Z coordinates at the first XY coordinate;
obtain second data representing two or more images of a second XY coordinate spaced apart from the first XY coordinate on the substantially flat substrate, wherein the two or more images of the second XY coordinate represent different Z coordinates at the second XY coordinate;
based on the second data, determine a sharpest Z coordinate at the second XY coordinate based on sharpness of the two or more images representing different Z coordinates at the second XY coordinate;
calculate a difference between the sharpest Z coordinate at the first XY coordinate and the sharpest Z coordinate at the second XY coordinate to measure the flatness of the detection stage along the Z-axis;
obtain third data representing a first image of an assay plate, wherein the assay plate is positioned on the detection stage, wherein the assay plate comprises a plurality of encoded microcarriers and a solution comprising at least a first analyte, wherein at least a first encoded microcarrier of the plurality comprises a capture agent specific for the first analyte, and wherein first image comprises an image of the code of the first encoded microcarrier; and
obtain fourth data representing a second image of the assay plate, wherein the second image detects an amount of the first analyte bound to the first encoded microcarrier by the capture agent.

48. An electronic imaging device comprising:
an objective,
a camera,
a light source,
a detection stage, and
a processing unit, the processing unit coupled to the objective, the camera, the light source, and the detection stage, the processing unit configured to:
using the objective, the light source, and the camera, obtain first data representing two or more images of a first XY coordinate on a substantially flat substrate positioned on the detection stage, wherein the two or more images represent different Z coordinates at the first XY coordinate;
based on the first data, determine a sharpest Z coordinate at the first XY coordinate based on sharpness of the two or more images representing different Z coordinates at the first XY coordinate;
using the objective, the light source, and the camera, obtain second data representing two or more images of a second XY coordinate spaced apart from the first XY coordinate on the substantially flat substrate, wherein the two or more images of the second XY coordinate represent different Z coordinates at the second XY coordinate;
based on the second data, determine a sharpest Z coordinate at the second XY coordinate based on sharpness of the two or more images representing different Z coordinates at the second XY coordinate;
calculate a difference between the sharpest Z coordinate at the first XY coordinate and the sharpest Z coordinate at the second XY coordinate to measure the flatness of the detection stage along the Z-axis;
using the objective, the light source, and the camera, obtain third data representing a first image of an assay plate, wherein the assay plate is positioned on the detection stage, wherein the assay plate comprises a plurality of encoded microcarriers and a solution comprising at least a first analyte, wherein at least a first encoded microcarrier of the plurality comprises a capture agent specific for the first analyte, and wherein first image comprises an image of the code of the first encoded microcarrier; and
using the objective, the light source, and the camera, obtain fourth data representing a second image of the assay plate, wherein the second image detects an amount of the first analyte bound to the first encoded microcarrier by the capture agent.

* * * * *